US010747274B2

(12) United States Patent
Uttermann et al.

(10) Patent No.: US 10,747,274 B2
(45) Date of Patent: Aug. 18, 2020

(54) ARCHITECTURE FEATURES OF AN ELECTRONIC DEVICE

(71) Applicant: Apple Inc., Cupertino, CA (US)

(72) Inventors: Erik A. Uttermann, Cupertino, CA (US); John Raff, Menlo Park, CA (US); Melody L. Kuna, Cupertino, CA (US); Jason S. Keats, Castro Valley, CA (US); G. Kyle Lobisser, Los Altos Hills, CA (US); John R. Kamorowski, Campbell, CA (US); Oliver C. Ross, San Francisco, CA (US); Guangtao Zhang, San Francisco, CA (US); Santhana Krishnan Balaji, Cupertino, CA (US); Jiang Ai, Cupertino, CA (US); Robert Scritzky, Sunnyvale, CA (US); Stephen R. McClure, Belmont, CA (US)

(73) Assignee: Apple Inc., Cupertino, CA (US)

( * ) Notice: Subject to any disclaimer, the term of this patent is extended or adjusted under 35 U.S.C. 154(b) by 827 days.

(21) Appl. No.: 15/253,758

(22) Filed: Aug. 31, 2016

(65) Prior Publication Data
US 2017/0068288 A1  Mar. 9, 2017

Related U.S. Application Data

(60) Provisional application No. 62/214,081, filed on Sep. 3, 2015.

(51) Int. Cl.
*G06F 1/16* (2006.01)
*H05K 5/00* (2006.01)
(Continued)

(52) U.S. Cl.
CPC .......... *G06F 1/1688* (2013.01); *G06F 1/1626* (2013.01); *G06F 1/1635* (2013.01);
(Continued)

(58) Field of Classification Search
CPC .... G06F 1/1626; G06F 1/1656; G06F 1/1635; G06F 1/181; G06F 1/183; G06F 1/203;
(Continued)

(56) References Cited

U.S. PATENT DOCUMENTS 6,653,919 B2    11/2003  Shih-Chung et al.
7,775,567 B2    8/2010   Ligtenberg et al.
(Continued)

FOREIGN PATENT DOCUMENTS

CN    101258787 A    9/2008
CN    102117104 A    7/2011
(Continued)

OTHER PUBLICATIONS

Japanese Patent Application No. 2016-171887—Office Action dated Oct. 23, 2017.
(Continued)

*Primary Examiner* — Anthony M Haughton
(74) *Attorney, Agent, or Firm* — Dickinson Wright RLLP

(57) ABSTRACT

A portable electronic device, having a single piece housing to carry operational components having a front opening, an integral bottom and sidewalls that cooperate to form a cavity in cooperation with the front opening. The operational components can include a display to present visual content disposed within the front opening and having an outermost protective layer, a main logic board that extends along a central portion of the cavity having a size and shape that bisects the cavity into a first portion and a second portion each having substantially the same size and shape, a power storage system supported at the bottom wall and comprising a first power storage unit located in the first portion and second power storage unit located in the second portion, (Continued)

each being coupled to the main logic board, and self-contained audio components positioned at each corner of the single piece housing.

18 Claims, 12 Drawing Sheets

(51) Int. Cl.
  *H05K 7/00* (2006.01)
  *G06F 1/18* (2006.01)
  *G06F 1/20* (2006.01)
  *H04B 1/3888* (2015.01)
  *H04M 1/02* (2006.01)
  *H04M 1/03* (2006.01)

(52) U.S. Cl.
  CPC ............ *G06F 1/1656* (2013.01); *G06F 1/183* (2013.01); *G06F 1/184* (2013.01); *G06F 1/203* (2013.01); *H04B 1/3888* (2013.01); *H04M 1/0262* (2013.01); *H04M 1/0277* (2013.01); *H04M 1/035* (2013.01)

(58) Field of Classification Search
  CPC ...... G06F 1/184; G06F 1/1688; H04M 1/026; H04M 1/0277; H04M 1/035; H04M 1/03; H04M 1/0262; H04B 1/3888
  See application file for complete search history.

(56) References Cited

U.S. PATENT DOCUMENTS

| | | | |
|---|---|---|---|
| 8,072,768 B2 | 12/2011 | Ockenfuss et al. | |
| 8,432,678 B2 * | 4/2013 | McClure | G06F 1/1613 361/679.3 |
| 8,936,691 B2 | 1/2015 | Leggett | |
| 9,501,099 B2 * | 11/2016 | Sim | G06F 1/1626 |
| 2001/0015005 A1 | 8/2001 | Chung et al. | |
| 2010/0061040 A1 | 3/2010 | Dabov et al. | |
| 2011/0164370 A1 | 7/2011 | McClure et al. | |
| 2012/0050151 A1 * | 3/2012 | Dabov | H05K 5/061 345/156 |
| 2012/0176277 A1 | 7/2012 | Malek | G01C 17/28 343/702 |
| 2012/0194997 A1 * | 8/2012 | McClure | G06F 1/1626 361/679.55 |
| 2014/0043744 A1 | 2/2014 | Matsuoka et al. | |
| 2014/0075743 A1 | 3/2014 | McClure et al. | |
| 2014/0104807 A1 * | 4/2014 | Dabov | G06F 1/1656 361/816 |
| 2014/0177902 A1 * | 6/2014 | Yeh | H04R 1/227 381/394 |
| 2015/0220299 A1 * | 8/2015 | Kim | G06F 3/0488 345/1.3 |
| 2016/0021444 A1 * | 1/2016 | Behles | H04R 1/288 381/354 |
| 2016/0088379 A1 * | 3/2016 | Lobisser | H04R 1/2888 381/332 |

FOREIGN PATENT DOCUMENTS

| | | |
|---|---|---|
| CN | 102117106 A | 7/2011 |
| CN | 103702242 A | 4/2014 |
| CN | 203882617 U | 10/2014 |
| EP | 1677571 A1 | 7/2006 |
| EP | 2713235 A1 | 4/2014 |
| JP | 2007180756 A | 7/2007 |
| JP | 2013516740 A | 5/2013 |
| JP | 2014116749 A | 6/2014 |
| JP | 2014123946 A | 7/2014 |
| KR | 1020130088982 A | 8/2013 |
| WO | 2010027565 A2 | 3/2010 |
| WO | 2011084186 A1 | 7/2011 |
| WO | 2012106216 A2 | 8/2012 |

OTHER PUBLICATIONS

Chinese Patent Application No. 201610791091.4—First Office Action dated Dec. 18, 2018.
Australian patent application No. 2016222502—Examination report No. 1, dated Mar. 24, 2017.
European Patent Application 16186539.9—Extended European Search Report dated Mar. 17, 2017.
European Patent Application No. 16186539.9—European Search Report dated Dec. 9, 2016.
Australian Patent Application No. 2016222502—Examination report No. 2, dated Jun. 14, 2017.
Blickenstorfer, C. H., "SDG Systems RAMPAGE 6—Large, versatile, ultra-rugged Android-based handheld computer with 5.7-inch display" [retrieved from the internet on Jun. 14, 2017]. <URL: https://web.archive.org/web/20141227142732/http://www.ruggedpcreview.com/3_handhelds_sdg_systems_rampage.html > published on Dec. 27, 2014 as per Wayback Machine, [7 pages]. Whole document.
Orf, D., "Acer Has a Crazy New Gaming Tablet" [retrieved from the internet on Jun. 14, 2017]. <URL: https://www.gizmodo.com.au/2015/04/acer-has-a-crazy-new-gaming-tablet/> published on Apr. 24, 2015, [16 pages]. Whole article.
Victor H. "Acer Predator 8 GT-810 tablet enters the scene: made for gamers" [retrieved from the internet on Jun. 14, 2017]. <URL:http://www.phonearena.com/news/Acer-Predator-8-GT-810-tablet-enters-the-scene-made-for-gamers_id73261> published on Sep. 2, 2015, [5 pages]. Whole article.
Davies, C., "Acer targets tablet gamers with Predator 8: Hands-on" [retrieved from the internet on Jun. 14, 2017]. <URL: https://www.slashgear.com/acer-targets-tablet-gamers-with-predator-8-hands-on-02400505/> published on Sep. 2, 2015, [7 pages] Whole article.
Triggs, R., "Acer announces Predator gaming smartphone and tablet" [retrieved from the internet on Jun. 14, 2017]. <URL: http://www.androidauthority.com/acer-predator-phone-and-tablet-638703/> published on Sep. 2, 2015, [6 pages]. Whole article.
Korean Patent Application No. 10-2016-0112993—Notice of Preliminary Rejection dated Jun. 18, 2017.
Chinese Patent for Utility Model No. ZL201621024002.5—Evaluation Report (UMPER) dated Jul. 19, 2017.

* cited by examiner

ARCHITECTURE FEATURES OF AN ELECTRONIC DEVICE

CROSS-REFERENCE TO RELATED APPLICATIONS

This application claims the benefit of priority under 35 U.S.C. § 119(e) to U.S. Provisional Application No. 62/214,081, filed on Sep. 3, 2015, and titled "ARCHITECTURE FEATURES OF AN ELECTRONIC DEVICE," the disclosure of each is incorporated herein by reference in its entirety.

FIELD

The following description relates to an electronic device. In particular, the following description relates to several internal features of an electronic device. The internal features may be used by the electronic device to enhance structural support as well as acoustical performance.

BACKGROUND

Electronic devices, which may include tablet devices, are known to include a display assembly coupled with an enclosure. An electronic device may include one or more circuits including a processor circuit and a memory circuit. The processor circuit may be used to cause the display assembly to show visual content based on, for example, a media file stored on the memory circuit. Further, the electronic device may further emit audible sound consistent with the visual content.

SUMMARY

Some embodiments can include a portable electronic device having a single piece housing arranged to carry operational components that can include a front opening, an integral bottom and sidewalls that cooperate to form a cavity in cooperation with the front opening. The operational components can include a display configured to present visual content and disposed within the front opening and having an outermost protective layer and a main logic board that extends along a central portion of the cavity having a size and shape that bisects the cavity into a first portion and a second portion each having substantially the same size and shape. The operational components can include a power storage system supported at the bottom wall and may include a first power storage unit located in the first portion and a second power storage unit located in the second portion, each being coupled to the main logic board. The operational components can include self-contained audio components positioned at each corner of the single piece housing.

Some embodiments can include an electronic device including an enclosure, a rib feature integrally formed with the enclosure, the rib feature defining a first region that receives an audio module and a second region connected to the first region, a cover sealed with the rib feature at the second region that combines with the second region to define a back volume for the audio module, and a circuit board disposed between a first power source and a second power source.

Some embodiments can include a method that can include arranging a main logic board within a single piece housing of a portable electronic device for carrying operational components, the housing having a front opening, an integral bottom and sidewalls that cooperate to form a cavity in cooperation with the front opening such that the main logic board extends along a central portion of the cavity having a size and shape that bisects the cavity into a first portion and a second portion each having substantially the same size and shape. The method can include disposing a power storage system at the bottom wall, the power storage system including a first power storage unit located in the first portion and second power storage unit located in the second portion, each being coupled to the main logic board and positioning self-contained audio components positioned at each corner of the single piece housing. The method can include arranging a display to present visual content within the front opening, the display having an outermost protective layer.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
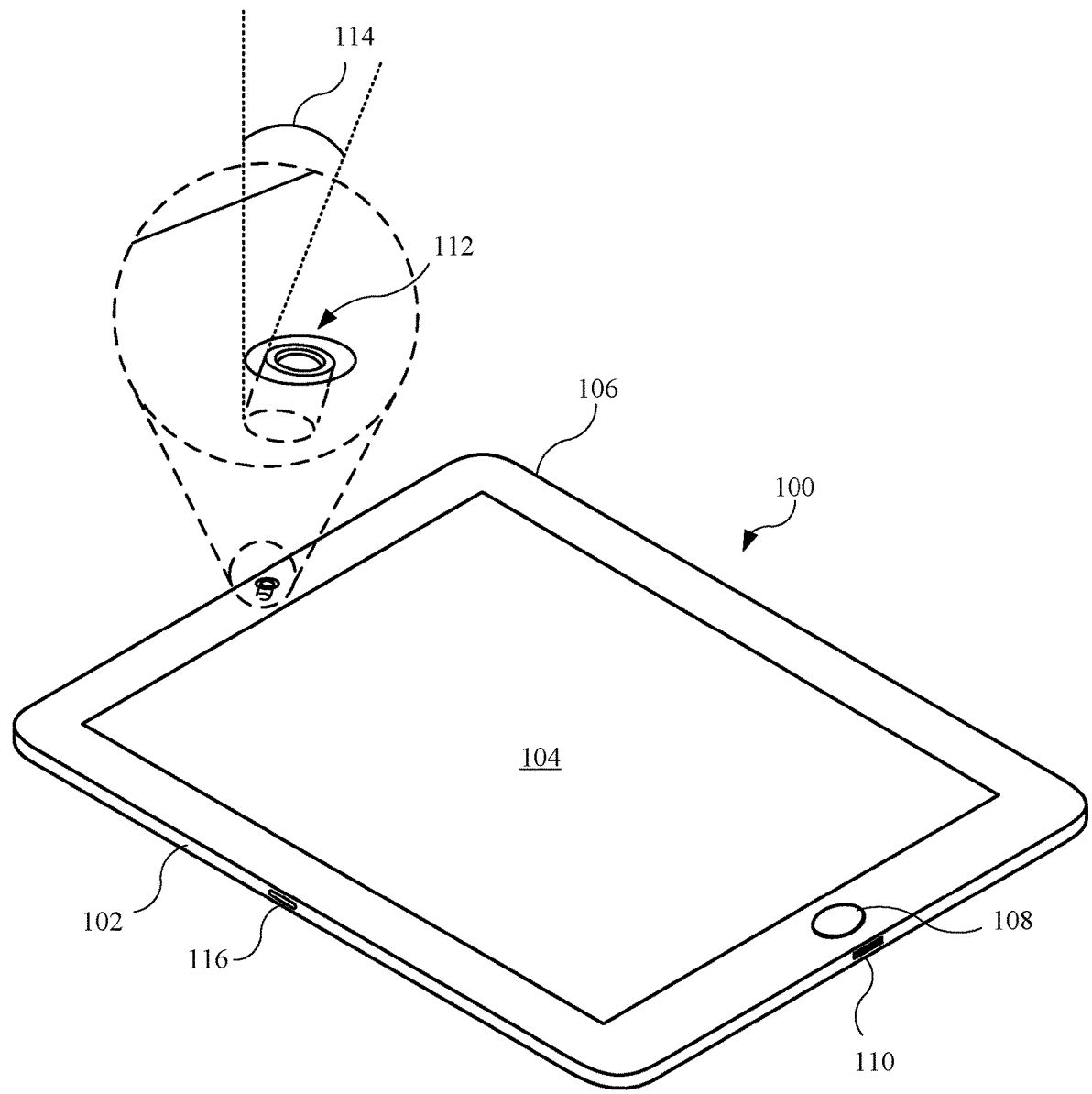
FIG. 1 illustrates an isometric view of an embodiment of an electronic device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an electronic device having various architectural enhancements. The enhancements described herein may include an improved internal layout of several internal components. For example, the electronic device may include a single piece housing having a bottom wall and several sidewalls defining an internal cavity arranged to carry several operational components. The electronic device may include multiple internal power supplies (batteries), including a first power supply and a second power supply, secured length wise with the bottom wall and extending across a substantial portion of the bottom wall. Also, each of the internal power supplies may also be positioned near a sidewall of the enclosure. Further, rather than a single, centrally located power supply, the power supplies described in the disclosure may be positioned along opposing sidewalls, thereby creating a space for several additional internal components, such as a circuit board, between the first power supply and the second power supply. Also, by securing the power supplies with the bottom wall, the power supplies not store electrical energy for the internal components, but also provide structural support to the bottom wall. Also, securing means between the power supplies and the bottom wall may include adhesives and/or double-sided tape.

The electronic device may further include several structural enhancements. For example, the enclosure may include several ribs integrally formed with the housing. The phrase "integrally formed" as used throughout this detailed description and in the claims refers two or more features formed from a single piece of material. For example, the enclosure may be formed from a single block of metal that undergoes a material removal operation with at least some of the remaining material of the single block of metal (after the material removal operation) defining the rib. In this regard, the material removal operation may include a cutting tool such as a computer number control ("CNC") cutting tool.

In addition, the ribs may be positioned at the corners of the enclosure to receive audio speakers designed to provide acoustical energy in the form of audible sound. For example, the ribs at one of the corners may define a rib member that includes a first region having a size and shape to receive an audio speaker. Further, the first region may be positioned to allow the audio speaker to emit acoustical energy through an opening (or openings) of a sidewall. The rib member may also define a second region designed to couple with a cover to form a back volume to enhance acoustical performance of the audio speaker. In this regard, at least one of the ribs may include an underpass opening to both the first and second regions. Also, the rib members at the corners of the enclosure may include second regions having different arrangements, thereby defining different sizes and shapes of the second regions of the rib members. This may create back volumes of different volumes in order to harmonize the acoustically energy emitted from the several audio speakers.

The aforementioned cover may adhesively secure with the second region to define a closed volume. Also, when the cover combines with the rib member at the second region, the combination of the cover and the rib member may provide additional structural support to the electronic device by resisting bending or twisting of the enclosure. In this regard, the cover may include several layers of material. In particular, at least some of the layers may several fibers embedded in the layers. In some cases, the layers include carbon fibers. Further, the layer may include a fiber configuration aligned diagonally, as an example, with respect to the sidewalls. For example, the fiber configuration may be directed toward the corner at which the cover and the rib member are located.

The electronic device may further include a can member designed to cover one or more internal components. In particular, the can member may cover a circuit board as well as several integrated circuits disposed on the circuit board. The can member may shield other sensitive components from electromagnetic interference ("EMI") generated from the integrated circuit when the can member covers the integrated circuits. Also, in some embodiments, the can member includes an opening, or cutout region, designed to at least partially receive an integrated circuit. In these embodiments, the can member may include an electrically conductive the covers the opening as well as the integrated circuit (extending through the opening), and provides an electrical grounding path for the integrated circuit.

In some instances, the can member includes an electro-thermal feature overlaying a surface of the can member. The electro-thermal feature may include several layers. For example, the electro-thermal feature may include a layer formed from a metal or metal alloy designed to provide an additional electrical grounding path for the integrated circuit. Further, the electro-thermal feature may include a second layer used to draw heat generated from the integrated circuit. Accordingly, the second lay may provide a thermal dissipation path for the integrated circuit. Further, in some embodiments, the electronic device includes a display assembly having a touch sensitive layer designed to receive a touch input from a user. The can member and the electro-thermal feature may combine to provide a support surface below the display assembly. Also, the support surface may include a planar or flat surface that prevent or limit issues, such as visual display artifacts and screen "tearing," related to a touch input to the display assembly in a location above the can member. Accordingly, the can member may not only provide electrical and thermal enhancements, but also provide a better user experience by improving video quality. The can member may be installed after installation of the integrated circuit and other components at a final test and assembly point. The ability to assemble at this later point makes testing and quality control easier to perform and manage. Also, the can member may be a singular body that covers multiple integrated circuits. This singular body feature, combined with the ability to assemble after all most components are installed, can simplify rework of the electronic device.

In order to provide electrical communication between internal components, the electronic device may include several flexible circuits. The flexible circuit may include flexible circuit assemblies or flexible cable assemblies, either of which may be designed to bend or twist without damaging while also carrying electrical signals between components. In some embodiments, at least one of the flexible circuits may include a design feature that increases the overall surface area of the flexible circuit. For example, the design feature may include an opening formed by a split in the flexible circuit with the flexible circuit subsequently merging together. This design feature may be disposed below the circuit board (such as a main logic board) and between the circuit board and the enclosure. In this regard, the flexible circuit may provide a protective buffer by absorbing a load force received by the enclosure, and in particular, in a location corresponding to the circuit board. For example, when the electronic device is dropped, a force or load to the enclosure may be transferred to the circuit board, causing some components to break away from the circuit board. The force may also damage the circuit board. However, the design feature (opening) of the flexible circuit may be in a location to provide some absorption of the force to the enclosure thereby limiting or preventing component issues related to dropping the electronic device.

The electronic device may also include a housing system designed to receive a subscriber identity module ("SIM") card that stores information related to the user, such as authentication information. The housing system may include an enclosed, modular feature that includes an ejection module within the modular feature reducing the footprint associated with the SIM card. This may increase internal space within the electronic device.

Also, the electronic device may further include a layout in which electrical signals associated with the display assembly are separated from electrical signal for other components. For example, the electronic device may include a control circuit, such as a video timing controller suitable for use with the display assembly. The video timing controller may extend lengthwise along the enclosure adjacent to one of the aforementioned power supplies. The video timing controller may generate several analog signals later converted to digital signals. In order to prevent interference from other electrical signals to those of the video timing controller, the electronic device may include a second flexible circuit dedicated solely to the video timing controller. Further, the electronic device may include a second circuit board electrically coupled with the second flexible circuit, and accordingly, with the video timing controller. The second circuit board may also include several integrated circuits used to process electrical signals from an input mechanism, such as a button of the electronic device, as well as light emitting diodes ("LEDs") used to provide light to the display assembly. The second flexible circuit, coupled with the video timing controller and the second circuit board, may further extend away from the second circuit board to electrically couple with the display assembly via several connectors of the second flexible circuit. However, the second flexible circuit may be designed to carry signals This may allow the electronic device to include improved signal quality. Also, an assembly time of the electronic device may be reduced as the display assembly may be assembled with the enclosure after the circuit board and the can member are assembled. In other words, the display assembly need not be directly coupled with and assembled contemporaneously with, the circuit board having the can member.

These and other embodiments are discussed below with reference to FIGS. 1-11. However, those skilled in the art will readily appreciate that the detailed description given herein with respect to these Figures is for explanatory purposes only and should not be construed as limiting.

FIG. 1 illustrates an isometric view of an embodiment of an electronic device 100, in accordance with the described embodiments. In some embodiments, the electronic device 100 is a mobile communications device, such as a smartphone. In the embodiment shown in FIG. 1, the electronic device 100 is a tablet device. The electronic device 100 may vary in shape and size. Also, the electronic device 100 may include an enclosure 102 designed to enclose and protect several internal components, such as a processor circuit, a memory circuit, etc. In some embodiments, the enclosure 102 is formed from a metal, such as aluminum.

Also, the electronic device 100 may include a display assembly 104 designed to present visual content. In some embodiments, the display assembly 104 includes a touch sensitive layer designed to receive a touch input and generate a command, in accordance with the touch input, to a processor circuit (not shown) of the electronic device 100. Further, in some embodiments, the display assembly 104 includes a capacitive touch sensitive layer designed to generate an input based upon a capacitive coupling with the display assembly 104. Further, an outer protective layer 106 made from a transparent material, such as glass, may also overlay the display assembly 104. Also, in some embodiments, the electronic device 100 includes a force detection sensor (not shown) designed to detect an amount of force applied to the display assembly 104 and/or the outer protective layer 106. The amount of force detected may be received by a processor circuit of the electronic device 100, in order to generate a command or input based on the amount of force.

In some embodiments, the electronic device 100 includes a button 108 designed to receive an input corresponding to a command to the electronic device 100 (for example, to change the visual content shown on the display assembly 104). Further, in some embodiments, the electronic device 100 includes a charge port 110 designed to receive power from a power source (not shown) in order to provide power to internal components of the electronic device 100 and/or power one or more power sources (such as battery packs) disposed in the electronic device 100.

Also, in some embodiments, the electronic device 100 includes a camera 112 designed to capture an image (or several images during a video recording) and store the image or images on a memory circuit (not shown) in the electronic device 100. Further, the camera 112 may be designed to capture an image of a user of the electronic device 100. In some embodiments, the electronic device 100 is relatively large. Accordingly, when the electronic device 100 is positioned on a flat surface, an image capture area of the camera 112 may be generally be normal with respect to the electronic device 100. However, as shown in FIG. 1, the camera 112 may be tilted at an angle 114 corresponding to an angle between an imaginary line (perpendicular with the electronic device 100) and a positioning of the camera 112 with respect to the imaginary line. The angle 114 may be approximately in the range of 5 to 15 degrees. In this manner, the camera 112 is tiled at an angle 114 such that the camera 112 may capture an image (or images) of the user even when 1) the electronic device 100 is on a flat surface and 2) the user is not positioned directly over the electronic device 100.

Further, in some embodiments, the electronic device 100 includes an electrical contact 116 designed to electrically couple the electronic device 100 with an electrical contact of another device, such as an accessory device (not shown) or another electronic device (not shown). Accordingly, the electrical contact 116 may include an electrically conductive material, such as a metal. Based on the electrical coupling with one of the aforementioned devices, the electronic device 100 may communicate or send information (such as model or design of the electronic device 100) to the other device. Further, the electrical coupling may allow the electronic device to receive information (such as model or design of the other device). Further, the electrical coupling may allow the electronic device 100 to receive an input or command from the other device. For example, in some cases, an accessory device may include a feature (or features) such as a keyboard or a touch pad designed to receive an input from a user. When the user generates an input to the feature, the input may pass to the electronic device 100 as a command to a processor circuit (not shown) of the electronic device 100. For example, the command received by the processor circuit may include changing the visual content presented on the display assembly 104. Also, in some embodiments, the electronic device 100 includes multiple electrical contacts (not shown) designed to electrically couple with a corresponding number of electrical contacts of another device.

Figure 2:
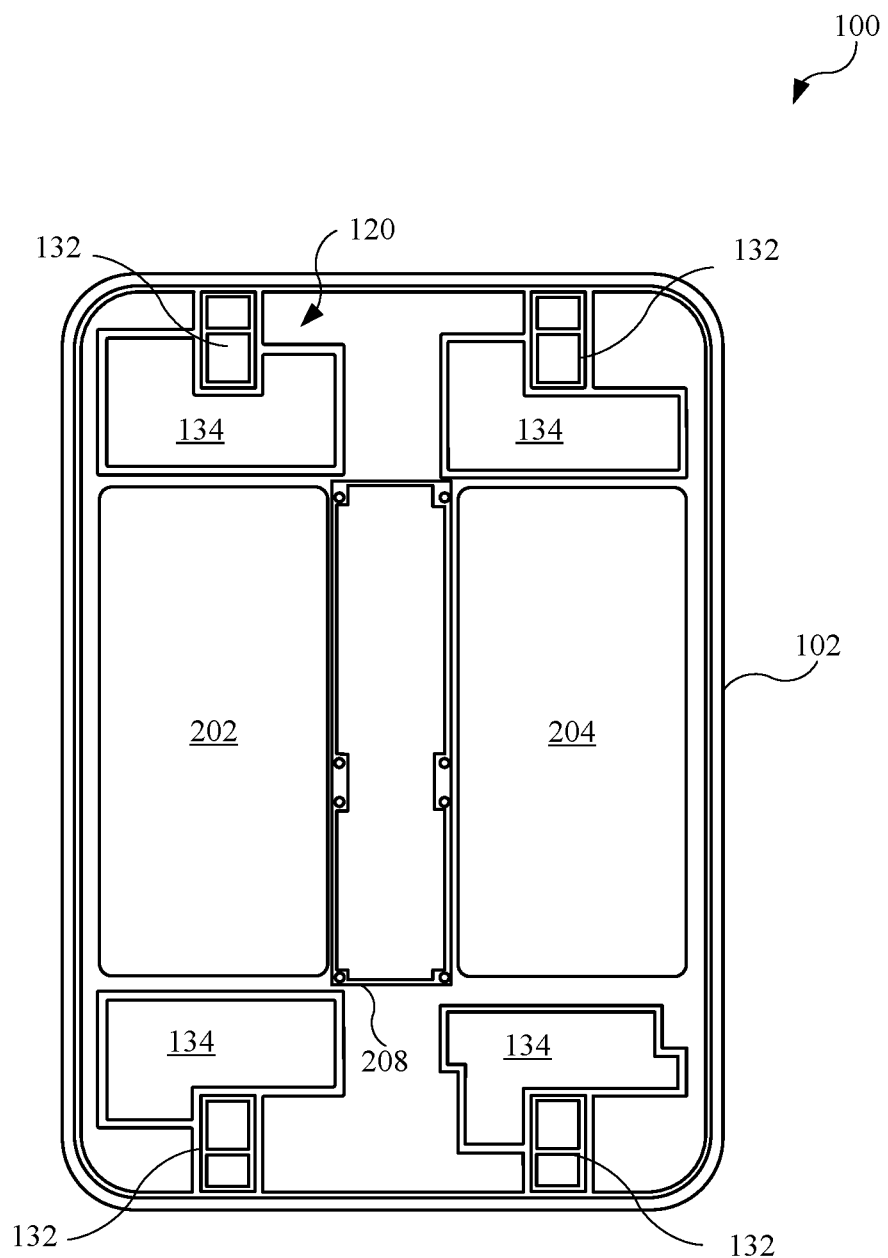
FIG. 2 illustrates a plan view of the electronic device shown in FIG. 1, showing several internal features of the electronic device.

FIG. 2 illustrates a plan view of the electronic device 100 shown in FIG. 1, showing several internal features of the electronic device 100. The display assembly 104 and other feature may be removed for purposes of illustration. As shown, the first power source 202 and the second power source 204 may be disposed lengthwise across the enclosure 102. In this manner, the first power source 202 and the second power source 204 may provide structural support to the enclosure 102, in additional to providing an internal power supply. This additional structural support may be useful, particularly when a thickness of the enclosure 102 is 1 millimeter or less.

The electronic device 100 may include several additional dual-purpose features. For example, the electronic device 100 may include a first rib feature 120 that may be integrally formed with the enclosure 102. The first rib feature 120 may be used to provide additional structural support to the enclosure 102, and accordingly, to the electronic device 100. As, the first rib feature 120 may form a box, or box-like feature. The first rib feature 120 may include a first audio module 132 and a first cover 134. The first cover 134 may enclose a region of the first rib feature 120 to define a back volume that receive some audio transmission from the first audio module 132. The back volume may be tuned to receive audio transmission in order to improve an overall sound quality of the electronic device 100. This will be discussed below. Also, the first cover 134 may also combine with the first rib feature 120 to not only improve acoustical performance, but also to improve the strength of the enclosure 102. The first rib feature 120 and associated components may be representative of several additional rib features and associated components, which will be shown and described below. Also, the rib features and their respective covers may combine to provide an improved structural rigidity as well as an improved acoustical performance.

Also, the electronic device 100 may include a can member 208 disposed between the first power source 202 and the second power source 204. The can member 208 cover a circuit board (not shown) having several integrated circuits. The can member 208 may be used to shield the internal components from electromagnetic radiation in the form of radio waves, for example, emitted from an internal component such as antenna (not shown). Further, the can member 208 may shield the antenna from electromagnetic interference ("EMI") generated from an integrated circuit covered by the can member 208.

Figure 3:
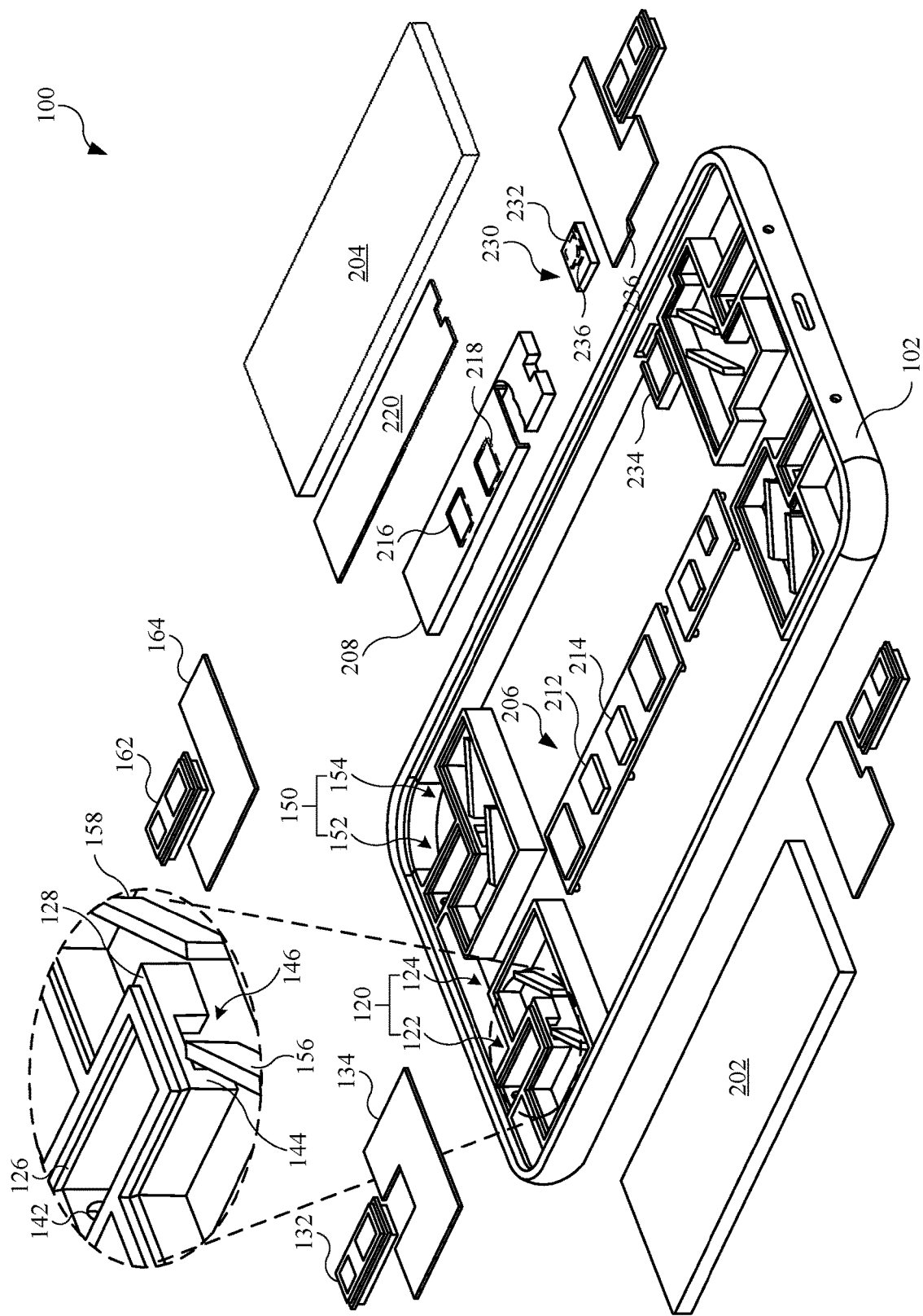
FIG. 3 illustrates an exploded view showing several internal features of the electronic device shown in FIG. 1.

FIG. 3 illustrates an exploded view showing several internal features of the electronic device 100 shown in FIGS. 1 and 2. The display assembly 104 and outer protective layer 106 are removed for purposes of illustration. The enclosure 102 may include several rib features designed to provide structural support to the electronic device 100 and combine with other features to enhance acoustical performance. For example, the electronic device 100 may include a first rib feature 120 that include several ribs integrally formed with the enclosure 102. Further, the ribs of the first rib feature 120 may be positioned along the enclosure 102 to define a first region 122 and a second region 124. The first region 122 may include a size and a shape designed to receive an audio module, such as a first audio module 132, designed to generate audible sound. Further, as shown in the enlarged view, a first ridge feature 126 may be formed along one or more ribs defining the first region 122. The first audio module 132 may be adhesively secured with the first region 122 along the first ridge feature 126. Also, although not shown, a foam ring may be used to further seal the first audio module 132 in the first region 122. Further, the audio modules may be positioned in the rib features in a manner allowing audible sound to emit through the enclosure 102 through several openings. For example, the first audio module 132, when disposed in the first region 122, may emit audio sound through a first opening 142 in the enclosure 102. In other embodiments, the enclosure 102 includes several openings similar to the first opening 142 in order to allow audible sound to pass from the first audio module 132 through the enclosure 102.

Each rib feature having a first region and a second region may vary in size and shape. However, the first region of each rib feature may include a substantially similar, or even identical, size and shape in order to receive an audio module of a consistent size and shape (corresponding to the size and shape of the first region 122). This allows for easier assembly, as each audio module is generally the same size and shape, and sorting of audio modules by size and shape is not required. For example, as shown in FIG. 3, the first region 122 of the first rib feature 120 may be substantially similar in size and shape as that of a first region 152 of a second rib feature 150. Accordingly, the first audio module 132 may be substantially similar in size and shape as that of a second audio module 162.

The second region 124 may include a size and a shape designed to receive a cover, such as a first cover 134. The covers may include several layers of material pressed or woven together. In some embodiments, the covers include one or more carbon fiber layers. Further, the covers may be formed according to a desired size and shape by means such as laser cutting or die cutting. The cover may provide additional structural support to the enclosure 102 as well as enhance the acoustical performance of the audio modules. This will be discussed further below. As shown in the enlarged view, a second ridge feature 128 may be formed along one or more ribs defining the second region 124. The first cover 134 may be adhesively secured with the second region 124 along the second ridge feature 128.

The second regions may vary shape according to a desired acoustic performance of each audio module. Further, the shape of the rib features may vary in order to accommodate one or more internal components proximate to the rib features. For example, as shown in FIG. 3, the second region 124 of the first rib feature 120 may include a different shape than that of a second region 154 of the second rib feature 150. However, despite the differences in shape, the size (including the volume) of each second region may be substantially similar. For example, the second region 124 of the first rib feature 120 may include a substantially similar size as that of the second region 154 of the second rib feature 150. Accordingly, the first cover 134 and a second cover 164 (designed for use with the second region 154) may include different shape but a substantially similar size, both of which may correspond to the size and shape of their respective second regions.

When the audio modules and covers are adhesively secured in the first regions and the second regions, respectively, the first regions and second regions may be sealed. Also, at least one rib shared by each first and (adjacent) second region may include an underpass linking the first regions to their respective second regions. Also, the second regions, enclosed by their respective covers, may define back volumes used with their respective audio modules. The back volume may be an enclosed space that receives some audible sound generated by the audio modules. Accordingly, the audio modules may also be positioned such that at least some audible sound passes through the respective underpasses and into the back volumes in order to enhance the acoustical performance of the audio modules. For example, as shown in the enlarged view, a rib 144 shared by the first region 122 and the second region 124 may include an underpass 146. In this manner, the second region 124, enclosed by the first cover 134, may define a first back volume for the first audio module 132. Further, due in part to the substantially similar sizes of the second regions, the back volumes may also be substantially similar in volume.

Also, the second region of each rib feature may include one or more ribs disposed within the second regions, and accordingly, within the back volumes. For example, as shown in enlarged view, the second region 124 may include a first rib 156 and a second rib 158. These ribs may be used to provide additional structural support. Also, the ribs may further be used and positioned to enhance acoustical performance. For example, during operation of the audio modules, the audible sound emitted from the audio modules may include an acoustical energy causing the covers to vibrate according one or more frequencies. Further, the covers may vibrate at a resonant frequency (determined by the material makeup of the covers), causing additional vibration of the covers based on a relatively high amplitude according to resonant frequency. This may lead to a reduced acoustical performance as well as increased likelihood of the covers delaminating (or becoming unglued) from the rib features. However, the ribs may act as partitions of the audible sound entering the back volumes, causing the covers to vibrate accordingly to additional frequencies. This may "spread out" the acoustical energy along several frequencies, including the resonant frequency, causing a reduced amplitude in each of the respective frequencies. As an example, the first rib 156 and the second rib 158 may reduce the vibrational energy of the first cover 134 during operation of the first audio module 132. This may improve the acoustic performance of the first audio module 132 as well as reduce the likelihood of the first cover 134 delaminating, as the first cover 134 may vibrate according to several frequencies having a relatively low amplitude.

While various features are described in detail for the first rib feature 120, the remaining rib features and respective components (such as an audio module and a cover) may include any feature or feature previously described for the first rib feature 120 and its components.

The electronic device 100 may include additional features. For example, as shown in FIG. 3, the electronic device 100 may include a first power source 202 and a second power source 204. In some embodiments, the first power source 202 and the second power source 204 are battery packs designed to store power and provide electrical current to several internal components of the electronic device 100, such as the display assembly 104 (shown in FIG. 1), the audio modules, and several integrated circuits. The power sources may be electrically coupled with several internal components via flexible circuits (not shown). Also, then first power source 202 and the second power source 204, when disposed in the enclosure 102, may be positioned along opposing sides of a first circuit board 206. In additional to providing power to various internal components, the first power source 202 and the second power source 204 may also provide additional structural support to the enclosure 102, as the first power source 202 and the second power source 204 are positioned along a lengthwise manner in the enclosure 102, and cover a substantial portion of the enclosure 102.

Also, the first circuit board 206 may include several integrated circuits, such as a first integrated circuit 212 and a second integrated circuit 214. In some cases, the first integrated circuit 212 and/or the second integrated circuit 214 may emit electromagnetic radiation that may cause interference with other components. Alternatively, the performance of the first integrated circuit 212 and/or the second integrated circuit 214 may be compromised by electromagnetic interference ("EMI") generated from one or more internal components external with respect to the first circuit board 206. However, the electronic device 100 may include a can member 208 disposed over the first circuit board 206. A partial cross section of the can member 208 is shown in FIG. 3. The can member 208 may be formed from a metal, including a metal alloy having phosphor and bronze. The can member 208 may contain the electromagnetic radiation generated by the integrated circuits disposed on first circuit board 206. Also, the can member 208 may prevent EMI from components external with respect to the can member 208 from interfering with the integrated circuits on the first circuit board 206.

Also the can member 208 may include openings in order to accommodate certain integrated circuits. For example, the can member 208 may include a first opening 216 and a second opening 218 designed to receive the first integrated circuit 212 and the second integrated circuit 214, respectively. The number of openings may vary according to the number of integrated circuits having dimensions that would otherwise engage the can member 208. Also, the can member 208 may include a conductive tape (not shown) overlaying the openings and providing an additional electrical grounding path for the first integrated circuit 212 and/or the second integrated circuit 214. Further, an electro-thermal member 220 may be disposed over the can member 208. The electro-thermal member 220 may include a thermally conductive layer, such as graphite, designed to draw heat from, and provide a thermal dissipation path for, the integrated circuits on the first circuit board 206. Also, the electro-thermal member 220 may include an electrically conductive layer disposed over the thermally conductive layer. The electrically conductive layer may be formed from metals such as nickel and/or copper. The electrically conductive layer may provide an additional electrical grounding path for at least some of the integrated circuits on the first circuit board 206. In this regard, the electro-thermal member 220 may be adhesively secured with the can member 208 via an electrically conductive adhesive (not shown) that provides an additional electrical grounding path. Also, the can member 208 may combine with the electro-thermal member 220 to provide a support surface below the display assembly (not shown). The support surface may be relatively flat and may also prevent or limit issues, such as visual display artifacts and screen "tearing," related to a touch input to the display assembly in a location corresponding to a location of the can member 208. Accordingly, the can member 208 may not only provide electrical and thermal enhancements, but also provide a better user experience by improving video quality. In some embodiments, the electro-thermal member 220 includes an additional electrically conductive layer adhesively secured with the thermally conductive layer via an electrically conductive adhesive, with the two electrically conductive layer sandwiching the thermally conductive layer. This will be further shown and described below.

Also, in some embodiments, the enclosure 102 undergoes an anodization operation in which the enclosure 102 is exposed to anodic bath containing several acidic compounds. The anodization operation may provide an oxidation layer to the enclosure 102 which may enhance the strength and appearance of the enclosure 102. However, the oxidation layer may render the enclosure 102 electrically inert. In this regard, the enclosure 102 may undergo a laser ablation process to remove portions of the oxidation layer, and exposing the original metal layer of the enclosure 102. Further, the can member 208 may be electrically coupled with the exposed metal layer (exposed by the laser ablation operation), and the can member 208 may combine with the enclosure 102 to provide an electrical grounding path.

Also, the electronic device 100 may further include a housing 230 for a SIM card tray 232 (shown as dotted lines). The SIM card tray 232 may carry a SIM card (not shown) that can hold identification and/or authentication information related to a user account associated with the electronic device 100. The housing 230 may be stored on a receiving feature 234 of the enclosure 102. The housing 230 may further include a pivot arm 236 (also shown as dotted lines) enclosed by the housing 230. The pivot arm 236 may be used to eject the SIM card tray 232. For example, in response to a force received by an external tool (not shown), the pivot arm 236 may be actuated in a rotational manner to eject the SIM card tray 232. This will be shown and described in further detail below.

Figure 4:
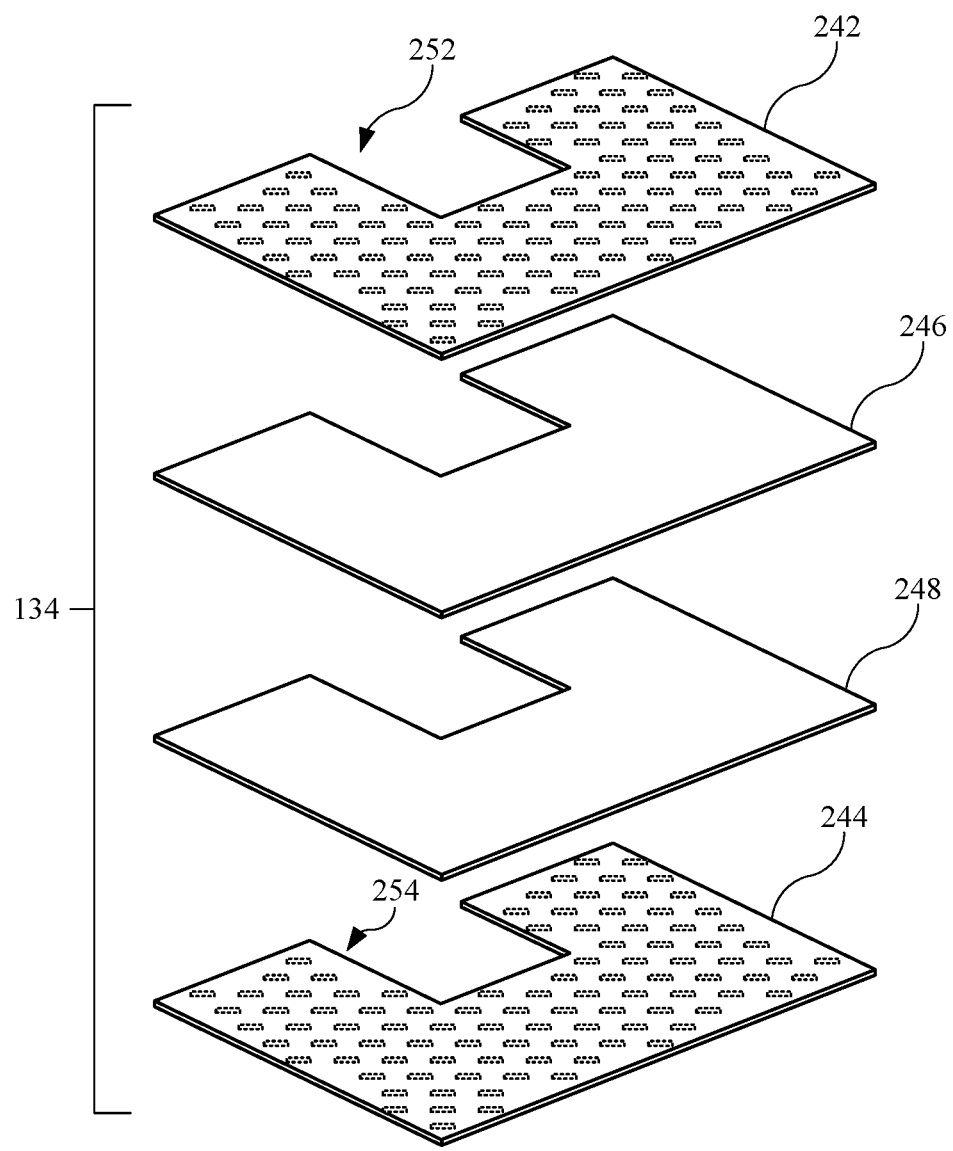
FIG. 4 illustrates an exploded view of the first cover shown in FIG. 3, in accordance with the described embodiments.

FIG. 4 illustrates an exploded view of the first cover 134 shown in FIGS. 2 and 3, in accordance with the described embodiments. The first cover 134 may include several layers, such as a first outer layer 242 and a second outer layer 244. Also, one or more layers may be positioned between the first outer layer 242 and the second outer layer 244, such as a first inner layer 246 and a second inner layer 248. Adjacent layers may be woven, or otherwise interlocked together.

Also, the first outer layer 242 and the second outer layer 244 may include a fiber material, such as a carbon fiber material. Further, the first outer layer 242 and the second outer layer 244 may include a fibers aligned according to a desired direction. For example, as shown in FIG. 3, the first outer layer 242 may include a first fiber configuration 252 defined by several fibers (shown as dotted lines) aligned according to a first direction. The first direction may be a diagonal direction aligned with a corner (not shown) of an electronic device. This will be shown below. Also, the second outer layer 244 may include a second fiber configuration 254 substantially similar to that of the first fiber configuration 252. The first cover 134 may be a representative cover of the remaining covers of an electronic device, with some modifications to the fiber configurations.

Figure 5:
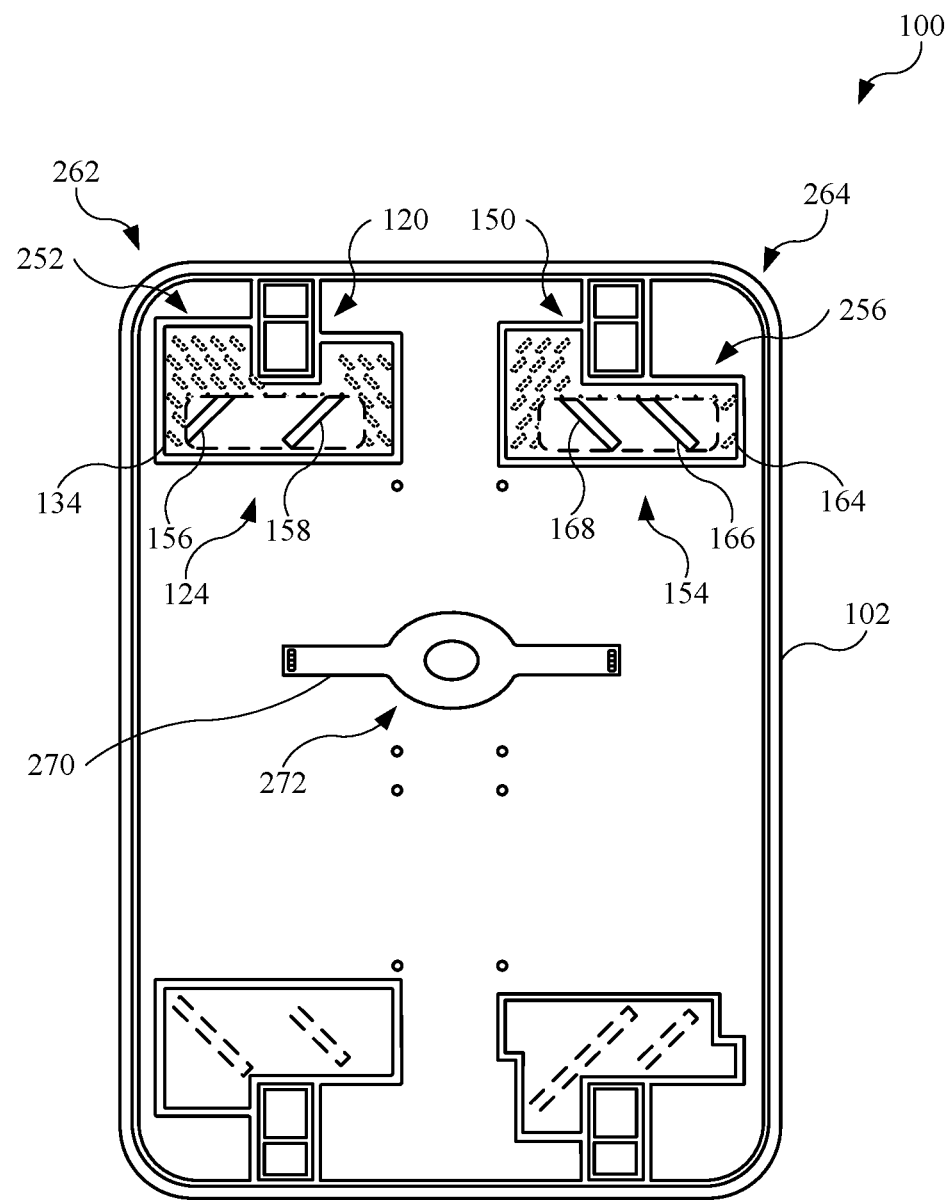
FIG. 5 illustrates a plan view of the electronic device shown in FIG. 3, showing the covers disposed over their respective second regions in accordance with several embodiments.

FIG. 5 illustrates a plan view of the electronic device 100 shown in FIG. 2, showing the covers disposed over their respective second regions. The first power source 202, the second power source 204, and the can member 208 are removed for purposes of simplicity. As shown, the first rib feature 120 includes the first cover 134 disposed in the second region 124 (of the first rib feature 120) and the second rib feature 150 includes the second cover 164 disposed in the second region 154 (of the second rib feature 150). FIG. 4 further shows a partial cutout of the first cover 134 showing the first rib 156 and the second rib 158 disposed in the second region 124.

Also, FIG. 5 further shows the first cover 134 having fibers aligned according to the first fiber configuration 252 (of the first outer layer 242, shown in FIG. 4). Further, the first fiber configuration 252 includes fibers of the first cover 134 aligned in a direction facing a first corner 262 of the electronic device 100. In other words, the first fiber configuration 252 includes fibers aligned in a direction toward (or away from) the first corner 262. However, the first rib 156 and the second rib 158 (disposed in the second region 124 of the first rib feature 120) are aligned perpendicular (or 90 degrees), or at least approximately perpendicular, with respect to the first fiber configuration 252. This perpendicular configuration between the ribs and the covers may increase the overall stiffness and rigidity of the electronic device 100, and in particular, the enclosure 102.

Similarly, the second cover 164 (disposed in the second region 154 of the second rib feature 150) may include a fiber configuration 256 aligned in a direction facing a second corner 264 of the electronic device 100. Further, a partial cutout of the second cover 164 shows ribs disposed in the second region 154 of the second rib feature 150 are aligned perpendicular, or at least approximately 90 degrees, with respect to the fiber configuration 256 of the second cover 164. As shown, the first rib 166 and the second rib 168 (disposed in the second region 154 of the second rib feature 150) are aligned perpendicular, or at least approximately perpendicular, with respect to the fiber configuration 256. This may further increase the overall stiffness of the electronic device 100, and in particular, the enclosure 102. It should be noted that the remaining covers and remaining ribs in the second regions of their respective second regions may include a similar configuration as the configuration shown for the first cover 134, the second cover, and their respective ribs.

Also, the electronic device 100 may include several flexible circuit assemblies designed to route signals to and from several integrated circuits, and/or to provide power in the form of electrical current from the powers sources (not shown) to internal components. Further, in some embodiments, the flexible circuits provide a dual purpose. For example, FIG. 5 illustrates a flexible circuit 270 having an opening 272 in the flexible circuit 270. The opening 272 splits the flexible circuit 270 into multiple regions to increase a surface area (and associated volume) of the flexible circuit 270. Further, not only does the flexible circuit 270 route signals and/or power, but the flexible circuit 270, in the embodiment shown in FIG. 5, may also provide support for a circuit board (not shown) disposed over the flexible circuit 270 such that the flexible circuit 270 is disposed between the enclosure 102 and the circuit board. For example, if the electronic device 100 receives a load or force in the event of a drop event, for example, the circuit board may become damages or an integrated circuit may become decoupled from the circuit board. However, the flexible circuit 270 may absorb some of the load or force from the impact of the drop event and causing the load or force to spread across the flexible circuit 270. Accordingly, the circuit board may incur a reduced load or force causing less stress to the circuit board. Also, although the flexible circuit 270 is shown having a particular design, the flexible circuit 270 may be modified to improve load impact. For example, in some embodiments, the flexible circuit 270 is disposed vertically (as opposed to the horizontal position shown in FIG. 5) and further includes several openings to increase the surface area (and associated volume) of the flexible circuit 270. The flexible circuit, being configured as described, where it crosses the circuit board, allows for arranging the circuit board centrally within the enclosure. Having the circuit board in the center of the enclosure can add the stiffness of the device. Locating the circuit board centrally can also improve signal integrity for the circuit board and connections.

Figure 6A:
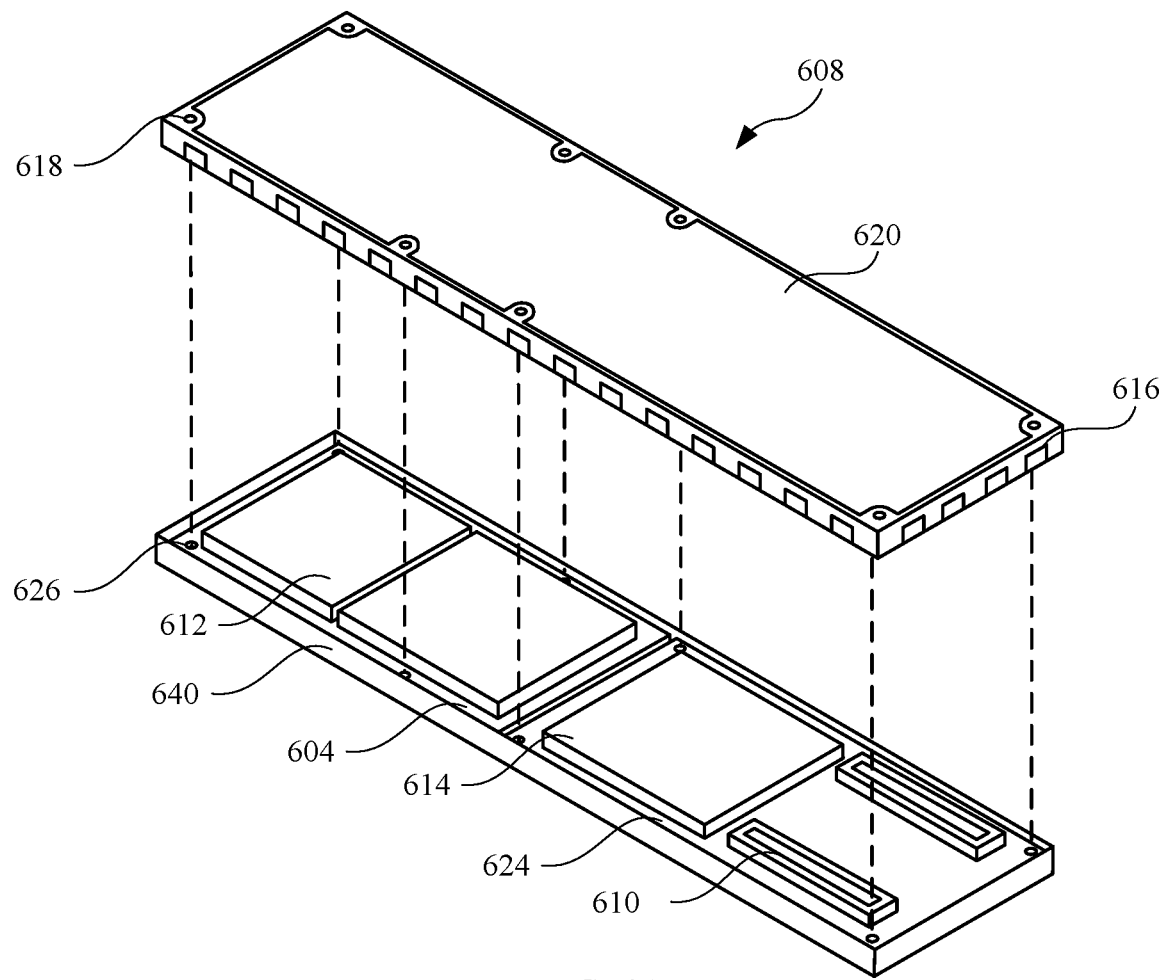
FIG. 6A illustrates an exploded view of a can member aligned with electronic components that may be covered by the can member, in accordance with several embodiments.

FIG. 6A illustrates an exploded view of a can member 608 aligned with several electronic components that may be covered by the can member 608. The can member 608 may be designed a printed circuit board ("PCB") and one or more integrated circuits disposed on a PCB. For example, a first PCB 604 may include a first integrated circuit 612. A second PCB 624 can include a second integrated circuit 614. The integrated circuits and electronic components can include Wi-Fi, cellular data antenna and other radio components, connectors, processors, memory, timing controller board, LED control boards and the like. While not shown additional integrated circuits can be included and can alone or in combination make up a main logic board or other circuit boards for controlling an electronic device, such as the electronic device 100 (shown in FIG. 1). The second PCB 624 may include a connector 610. First PCB 604 and second PCB 624 may be installed in a retention channel 640 for locating and installing the PCBs to an enclosure, such as the enclosure 102 (shown in FIG. 1). The can member 608 can be configured to couple with the retention channel 640 to mechanically retain can member 608 to retention channel 640. Also, the can member 608 can include spring finger snaps 616 (shown in FIG. 6B) to provide pressure for retaining the can member 608 to the retention channel 640. The can member 608 can also be coupled to the retention channel 640 and the electronic components, such as the first integrated circuit 612 and the second integrated circuit 614, by pressure sensitive adhesive, or PSA (not shown). The PSA may include dual sided adhesion characteristics so that the PSA may provide a stronger adhesion force to the electronic components relative to an adhesion force of the can member 608 to allow the can member 608 to be removed more easily for rework operations if necessary. Can member 608 can also be restrained to the enclosure by way of screws (not shown) installed in screw holes 618 through can member 608 and screw holes 626 in the PCBs. The screws can additionally provide part of an electrical grounding path for the electronic components electrically coupled with the screws. The can member 608 can provide the benefit of covering multiple electronic components and connections and can be installed towards the end of the manufacturing process in the final assembly test and pack operation. The can member 608 can provide electrical shielding between components that otherwise create interference from cross talk. Heat dissipation and grounding can be provided by an electro-thermal member 620, which can be installed to the topside of the can member 608 and can act as a cowling for the electronic components as well as the connectors (including board to board connectors) covered by the can member 608. Electro-thermal member 620, shown in FIG. 7A, and its various features are shown and described below.

Figure 6B:
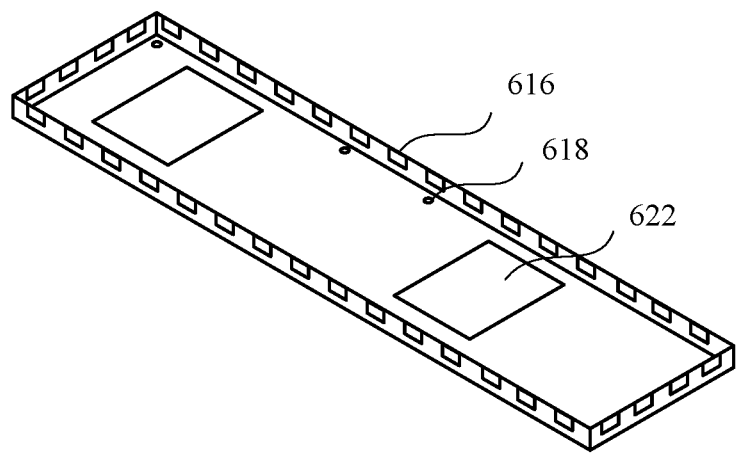
FIG. 6B illustrates a bottom view of the can member shown in FIG. 6A, in accordance with several embodiments.

FIG. 6B illustrates a bottom view of the can member 608. An opening 622 can penetrate the can member 608 to accommodate electronic components that might otherwise interact with the can member 608, such as first integrated circuit 612 or second integrated circuit 614. Insulation (not shown) can be provided in the opening to coordinate with electronic components when the can member is installed to the electronic device.

Figure 7A:
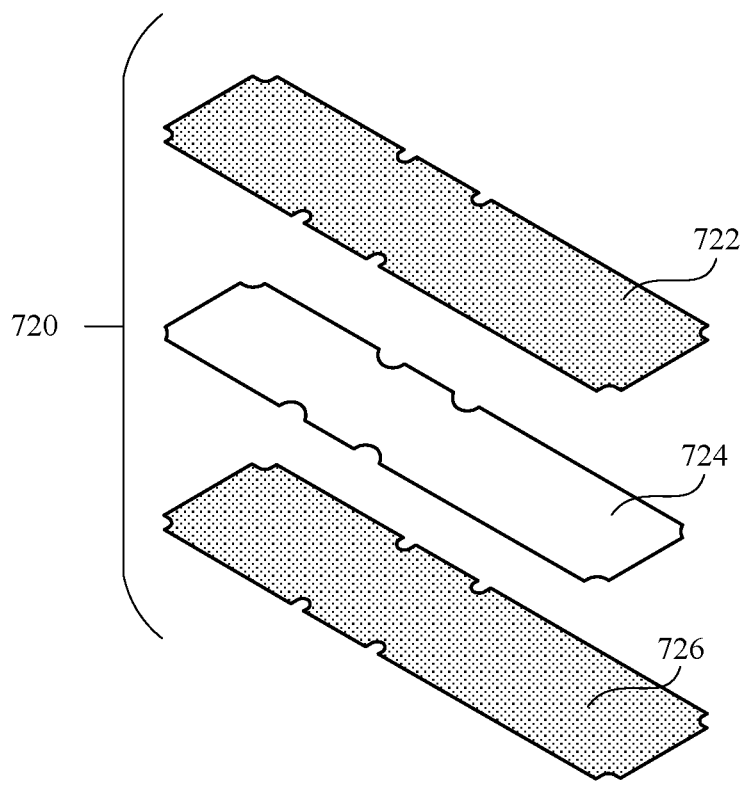
FIG. 7A illustrates an exploded view of an embodiment of an electro-thermal member that may be disposed over a can member, in accordance with the described embodiments.
Figure 7B:
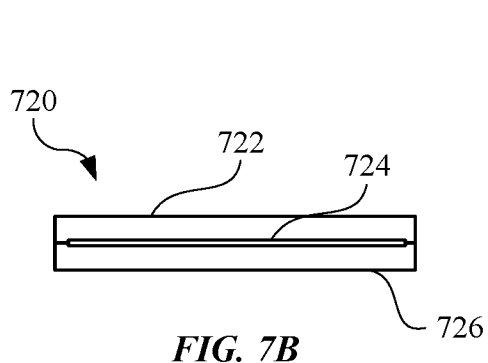
FIG. 7B illustrates a cross sectional view of the electro-thermal member of FIG. 7A in accordance with several embodiments.
Figure 7C:
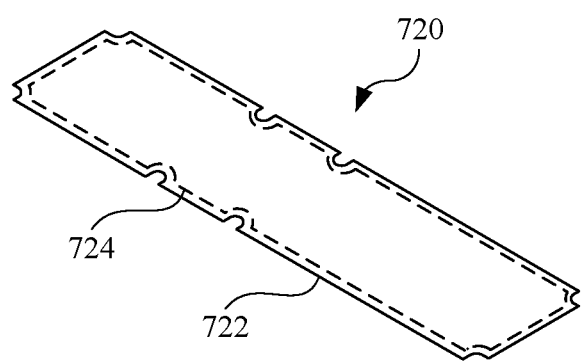
FIG. 7C illustrates the boundary of a graphite layer in relation to the other layers of the electro-thermal member of FIG. 7A in accordance with several embodiments.

FIG. 7A illustrates an exploded view of an embodiment of an electro-thermal member 620 that may be disposed over a can member, in accordance with the described embodiments. The electro-thermal member 720 can be made up of several layers including a first adhesion layer 722, a graphite layer 724, and a second adhesion layer 726. The first adhesion layer 722 and the second adhesion layer 726 can be electrically conductive. FIG. 7B illustrates a cross sectional view of the electro-thermal member 720 of FIG. 7A. As illustrated, the graphite layer 724 can be fully enclosed by the first adhesion layer 722 and the second adhesion layer 726 to prevent flaking off of any graphite from graphite layer 724 and retain the graphite layer 724 between the two layers. FIG. 7C illustrates how the graphite layer 724 may include a smaller boundary profile than both the first adhesion layer 722 and the second adhesion layer 726. The graphite layer 724 can dissipate and/or transfer the heat from a given electronic component over a broad region. Likewise, the graphite layer 724 can take the form of many shapes and sizes to suite the particular thermal dissipation needs of the particular electronic component or components. For instance, the graphite layer 724 can take various shapes or be formed into paths that lead heat in particular directions to dissipate the heat generated by the electronic components to a predetermined area.

Figure 8A:
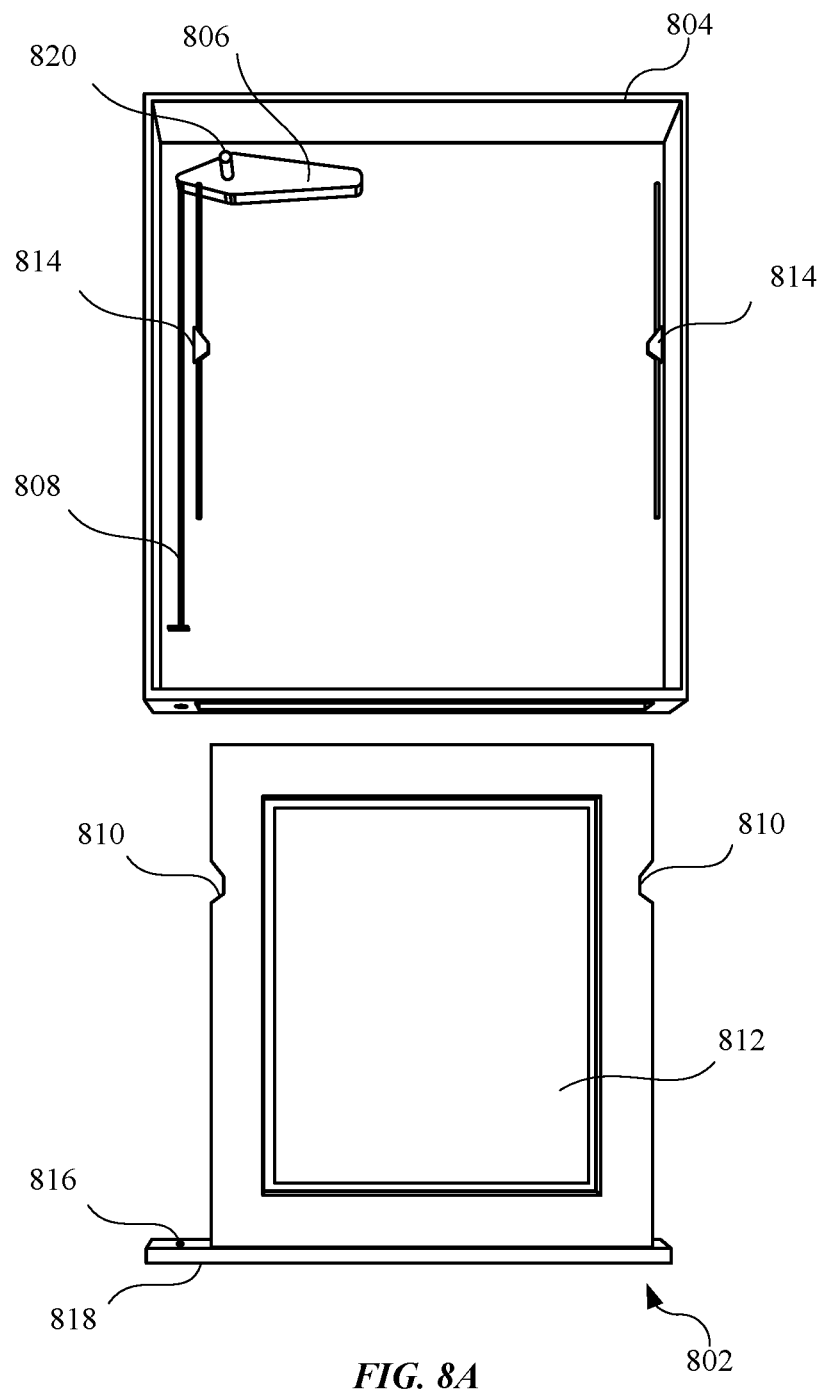
FIG. 8A illustrates a top view showing a SIM card tray and an enclosure, in accordance with several embodiments.

The electronic device 100 (shown in FIG. 1) may be designed receive a subscriber identity module ("SIM") card, as well as various features to retain and ejected the SIM card. For example, FIG. 8A illustrates a plan view of a SIM card tray 802 and an SIM enclosure 804 (also referred to as a housing) designed to receive the SIM card tray 802. As shown, the SIM enclosure 804 may include a pivot arm 806 integrated with the SIM enclosure 804 and used to eject the SIM card tray 802. The SIM card tray 802 can hold a SIM card 812 that provides an electronic device with identification and/or authentication information. The SIM card tray 802 may include retention cutouts 810 located on the sides that can coordinate with retention clips 814 arranged in the SIM enclosure 804. The retention clips 814 can be spring loaded and biased so that when the SIM card tray 802 is installed in the SIM enclosure 804 the retention clips 814 engage the retention cutouts 810 and hold the SIM card tray 802 in the SIM enclosure 804. The SIM card tray 802 may include a release aperture 816 located in a front wall 818 through the front for inserting a tool (not shown) that can engage with a lever arm 808 arranged in the SIM enclosure 804. The lever arm 808 can be connected to a pivot 820 also arranged in the SIM enclosure 804. The pivot arm 806 can be engaged at the bottom and/or rear portion of the SIM card tray 802 when SIM card tray 802 is installed in the SIM enclosure 804.

Figure 8B:
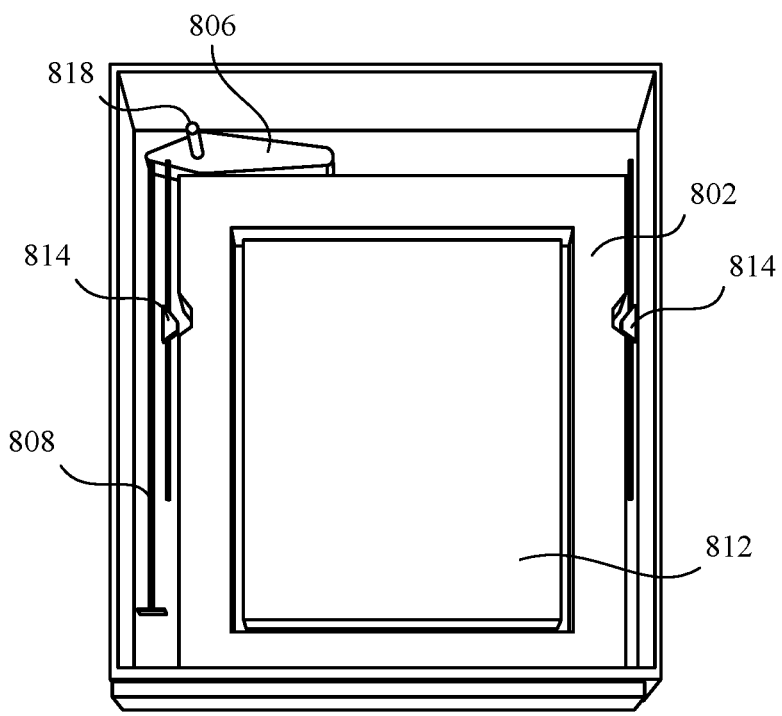
FIG. 8B illustrates a top view of the SIM card tray and enclosure shown in FIG. 8A, further showing the SIM card tray installed in the housing, in accordance with several embodiments.

FIG. 8B illustrates when the SIM card tray 802 is installed in the SIM enclosure 804. Here, SIM card tray 802 biases the pivot arm 806 in an inactive state.

Figure 8C:
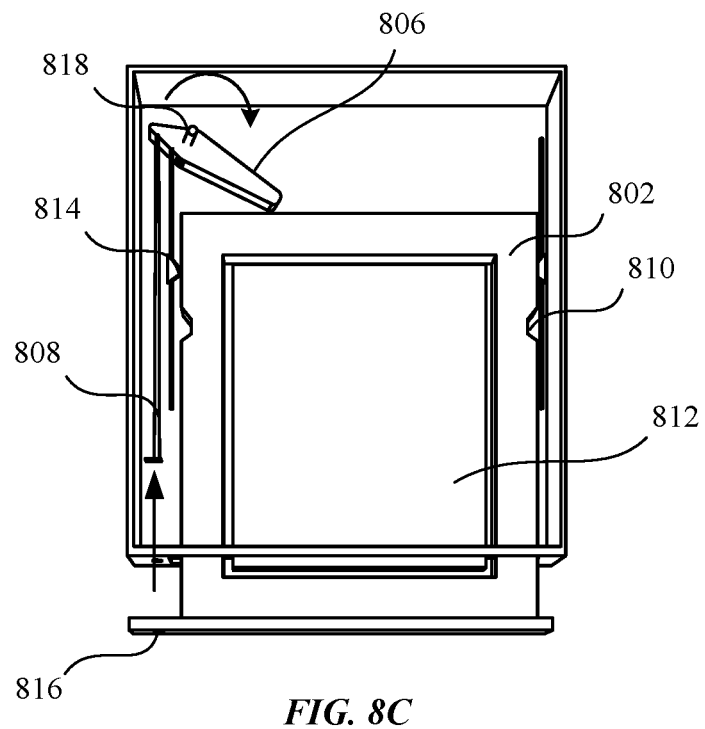
FIG. 8C illustrates a top view of the SIM card tray and enclosure shown in FIG. 8A, further showing the SIM card tray being ejected from the housing by actuating the lever arm in accordance with several embodiments.

Alternatively, FIG. 8C illustrates when a tool (not shown) is used to depress the lever arm 808. Here, in response to a force applied to the pivot arm 806 by the lever arm 808, the pivot arm 806 rotates about a pivot 820 and presses the SIM card tray 802 with sufficient force to overcome the retention force exerted by the retention clips 814 on the retention cutouts 810 and the SIM card tray 802 is pressed out of the SIM enclosure 804. Because the retention clips 814, the lever arm 808, the pivot arm 806 and the pivot 820 are all enclosed by the SIM enclosure 804, SIM enclosure 804 provides the benefit of being more modular making it easier to install and rework if necessary.

Figure 9A:
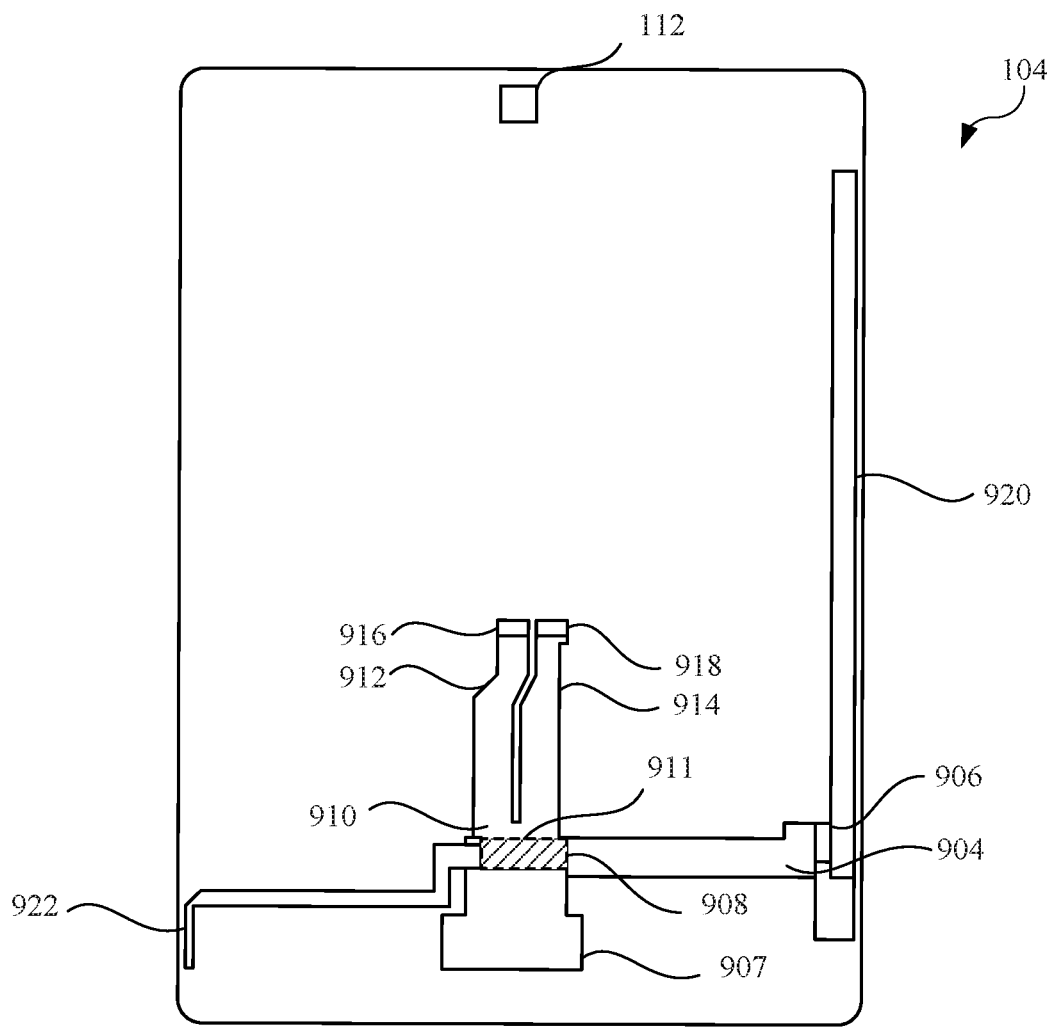
FIG. 9A illustrates a plan view of an embodiment of flexible cable assembly 902, in accordance with several described embodiments.
Figure 9B:
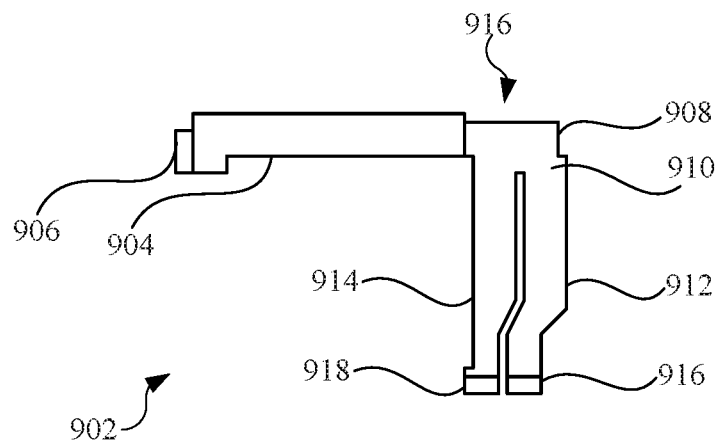
FIG. 9B illustrates a backside of the display assembly 104 (shown in FIG. 1), showing the flexible cable assembly 902 electrically coupled with several internal components.

FIG. 9B illustrates a plan view of an embodiment of flexible cable assembly 902, in accordance with several described embodiments. The flexible cable assembly 902 may provide an electrical communication path between several electrical components of an electronic device (not shown), and may include some portions dedicated to specific components. This will be discussed below. The flexible cable assembly 902 may include a first cable portion 904 having a first connector 906 designed to electrically couple with an internal component of the electronic device. The flexible cable assembly 902 may further include a central cable portion 908 designed to electrically couple with an additional internal component. Also, the flexible cable assembly 902 may further include a second cable portion 910 designed to electrically couple with an additional electrical component. As shown, the second cable portion 910 may split into first tail 912 and a second tail 914. Both the first tail 912 and the second tail 914 may include a first connector 916 and a second connector 981, respectively. The first connector 916 and the second connector 918 can be used to electrically couple their respective tails with an internal component. The split in second cable portion 910 can make installing and rework operations easier as the connectors are easier to install and uninstall in a relatively small space. Also, the first cable portion 904 and the second cable portion 910 can be separated into distinct portions to prevent "cross talk" amongst electrical signals that travel through the various regions of the flexible cable assembly 902. This will be explained below.

FIG. 9A illustrates a backside of the display assembly 104 (shown in FIG. 1), showing the flexible cable assembly 902 electrically coupled with several internal components. As shown, the flexible cable assembly 902 may use the first cable portion 904, including the first connector 906, to couple with a timing controller board 920 ("TCON board")

positioned at the edge of the backside of the display assembly 104. The timing controller board 920 may provide a controller mechanism for the display assembly 104. Also, the timing controller board 920 may be positioned so as to not engage the power sources (shown in FIG. 2). Also, the timing controller board 920 can be connected to an interposer board 907 by way of the first cable portion 904 and the central cable portion 908. The connection for the central cable 908 to the TCON board 920 can be a zero insertion force ("ZIF") connection or any other suitable cable-to-board connection. The interposer board 907 may include a chip set (not shown) for converting analog signals received from the TCON board 920 into digital signals that can be sent to the MLB (not shown). The interposer board 907 may include a hotbar pad 911. The hotbar pad 911 may include connection pads that are offset and alternating or configured in rows. Although not shown, several other configurations are possible. The central cable 908 can be connected to the interposer board 907 by way of the hotbar pad 911.

Since the MLB flex 910 (second cable portion 910) is connected when display assembly 104 and enclosure 102 (shown in FIG. 1) are coupled together. The TCON flex 908 (central cable portion 908) and the MLB flex 910 can be separated into distinct portions shown to prevent "cross talk" amongst signals that travel through the various cables as well as to allow for centralized arrangement of the interposer board 907. Locating the interposer board 907 centrally within the enclosure also makes it closer to the MLB, which can improve signal integrity. Other electrical components can be connected to the interposer board 907 such as an LED (not shown) by way of an LED cable 922, for example, amongst others including a power button etc.

The display assembly 104 can be connected to the interposer board 907 by way of a MLB 910, shown in FIG. 9B. The MLB flex 910 and the TCON flex 908 can be integrated into a single integrated cable. The integrated cable 916 may include multiple tails. At one end, the integrated cable 916 can be connected to the interposer board 907 (shown in FIG. 9A) by way of a hotbar pad 910 and the tails of the integrated cable 916 each extend to their own respective connections for their respective components. The MLB flex 910 can be split into two tails, a first tail 912 and a second tail 914, with connectors at the respective ends of each tail that can connect with the MLB, not shown. The split in MLB flex 910 can make installing and rework operations easier as the connectors are easier to install and uninstall in a small space since the MLB flex 910 is connected when display assembly 104 and enclosure 102 (shown in FIG. 1) are coupled together. The TCON flex 908 and the MLB flex 910 can be separated into distinct portions shown to prevent "cross talk" amongst signals that travel through the various cables as well as to allow for centralized arrangement of the interposer board 907. Locating the interposer board 907 centrally within the enclosure also makes it closer to the MLB, which can improve signal integrity. Other electrical components can be connected to the interposer board 907 such as an LED (not shown) by way of an LED cable 922, for example, amongst others including a power button etc.

Figure 10:
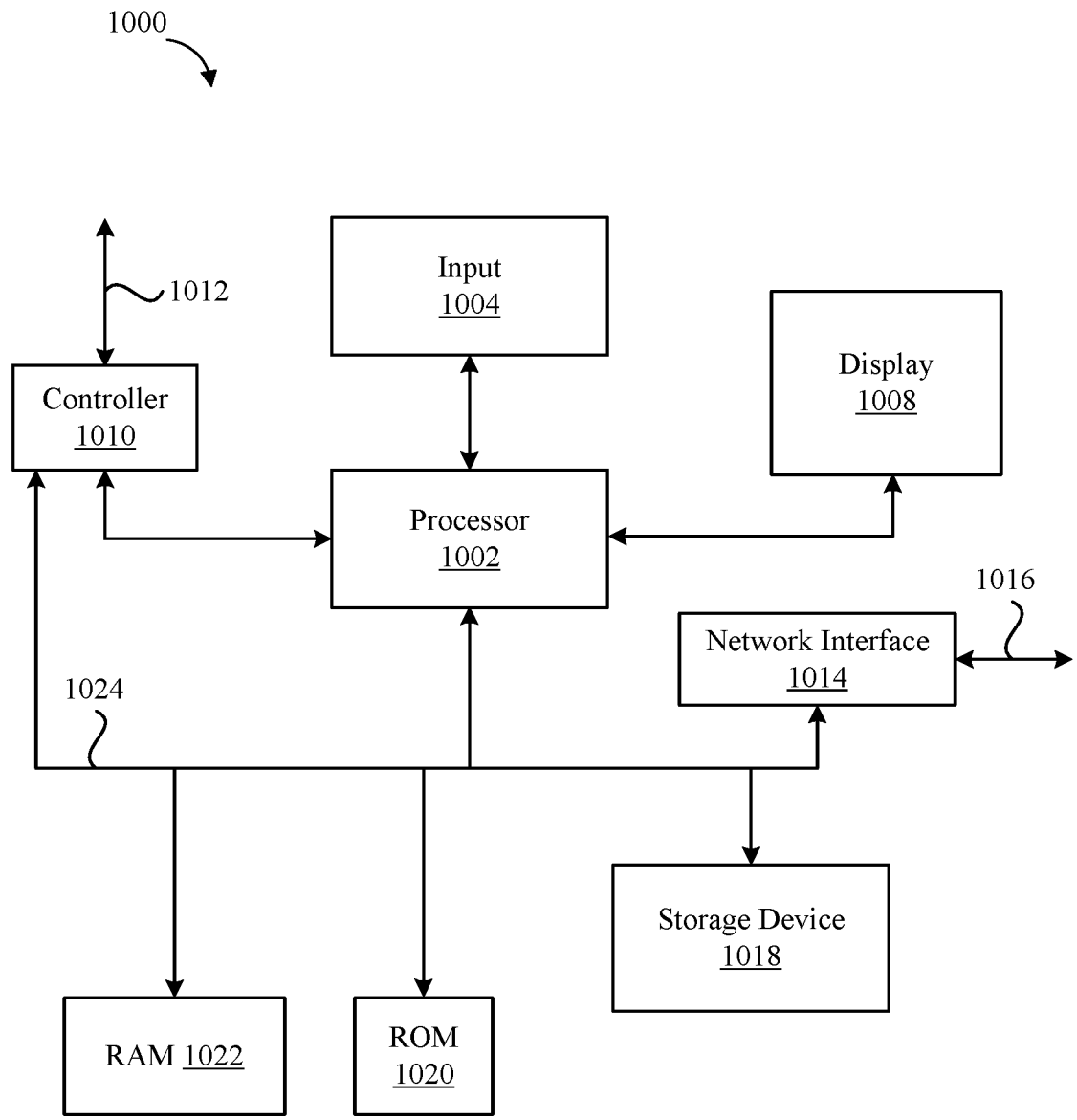
FIG. 10 is a block diagram of a computing device that can represent some of the components of the electronic device, in accordance with the described embodiments.

FIG. 10 is a block diagram of a computing device 1000 that can represent some of the components of the electronic device. It will be appreciated that the components, devices or elements illustrated in and described with respect to FIG. 10 may not be mandatory and thus some may be omitted in certain embodiments. The computing device 1000 can include a processor 1002 that represents a microprocessor, a coprocessor, circuitry and/or a controller for controlling the overall operation of the computing device 1000. Although illustrated as a single processor, it can be appreciated that the processor 1002 can include a plurality of processors. The plurality of processors can be in operative communication with each other and can be collectively configured to perform one or more functionalities of the computing device 1000 as described herein. In some embodiments, the processor 1002 can be configured to execute instructions that can be stored at the computing device 1000 and/or that can be otherwise accessible to the processor 1002. As such, whether configured by hardware or by a combination of hardware and software, the processor 1002 can be capable of performing operations and actions in accordance with embodiments described herein.

The computing device 1000 can also include a user input device 1004 that allows a user of the computing device 1000 to interact with the computing device 1000. For example, the user input device 1004 can take a variety of forms, such as a button, keypad, dial, touch screen, audio input interface, visual/image capture input interface, input in the form of sensor data, etc. Still further, the computing device 1000 can include a display 1008 (screen display) that can be controlled by the processor 1002 to display information to a user. A controller 1010 can be used to interface with and control different equipment through an equipment control bus 1012. The computing device 1000 can also include a network/bus interface 1014 that couples to a data link 1016. The data link 1016 can allow the computing device 1000 to couple to a host computer or to accessory devices. The data link 1016 can be provided over a wired connection or a wireless connection. In the case of a wireless connection, network/bus interface 1014 can include a wireless transceiver.

The computing device 1000 can also include a storage device 1018, which may include a single disk or a plurality of disks (e.g., hard drives) and a storage management module that manages one or more partitions (also referred to herein as "logical volumes") within the storage device 1018. In some embodiments, the storage device 1018 can include flash memory, semiconductor (solid state) memory or the like. Still further, the computing device 1000 can include Read-Only Memory (ROM) 1020 and Random Access Memory (RAM) 1022. The ROM 1020 can store programs, code, instructions, utilities or processes to be executed in a non-volatile manner. The RAM 1022 can provide volatile data storage, and store instructions related to components of the storage management module that are configured to carry out the various techniques described herein. The computing device 1000 can further include data bus 1024. The data bus 1024 can facilitate data and signal transfer between at least the processor 1002, the controller 1010, the network/bus interface 1014, the storage device 1018, the ROM 1020, and the RAM 1022.

Figure 11:
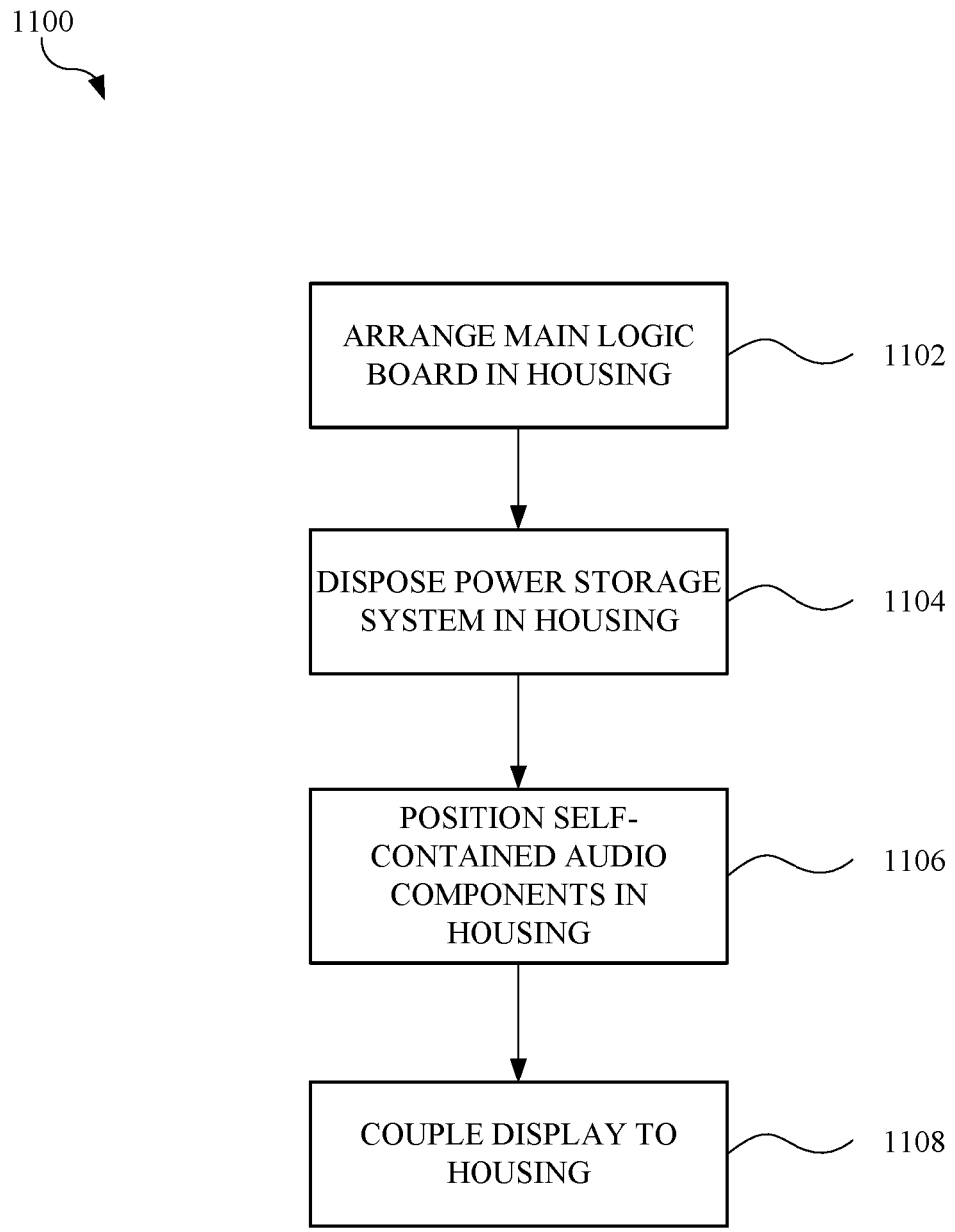
FIG. 11 is a flow chart illustrating a method for assembling a portable electronic device in accordance with several embodiments.

FIG. 11 illustrates a flowchart showing a method 1100 for assembling electronic device, in accordance with the described embodiments. The method 1100 may include steps for forming an electronic device, such as the electronic device 100 (shown in FIG. 1). The steps of the method are provided in the order below by way of example only, but of course the steps can be rearranged to assemble the electronic device. That said, the method 1100 can begin in a first step 1102 with arranging a main logic board within a single piece housing of a portable electronic device for carrying operational components were the housing has a front opening, an integral bottom and sidewalls that cooperate to form a cavity in cooperation with the front opening such that the main logic board extends along a central portion of the cavity having a size and shape that bisects the cavity into a first portion and a second portion each having substantially the same size and shape. In a second step 1104, the method can include disposing a power storage system at the bottom wall where the power storage system has a first power storage unit located in the first portion and second power storage unit located in the second portion, each being coupled to the main logic board. In a third step 1106, the method can include positioning self-contained audio components at each corner of the single piece housing. In a fourth step 1108, the method can include arranging a display to present visual content within the front opening, the display having an outermost protective layer.

Various embodiments are described herein. These embodiments include at least the following. Some embodiments include a portable electronic device, having a single piece housing arranged to carry operational components that can include a front opening, an integral bottom and sidewalls that cooperate to form a cavity in cooperation with the front opening. The operational components can include a display configured to present visual content and disposed within the front opening and having an outermost protective layer and a main logic board that extends along a central portion of the cavity having a size and shape that bisects the cavity into a first portion and a second portion each having substantially the same size and shape. The operational components can include a power storage system supported at the bottom wall and comprising a first power storage unit located in the first portion and a second power storage unit located in the second portion, each being coupled to the main logic board and self-contained audio components positioned at each corner of the single piece housing.

In some embodiments the self-contained audio components have a rib feature defining a first region that receives an audio module and a second region connected to the first region. In some embodiments the second region comprises a rib integrally formed within the second region and disposed in the second region, the rib configured to spread an acoustical energy of the audio module. Some embodiments can include a cover sealed with the rib feature at the second region that combines with the second region to define a back volume for the audio module, the cover comprising several layers of materials, and wherein at least one layer of material comprises carbon fiber having several fibers.

In some embodiments the cover includes a first outer layer, a second outer layer, and an inner layer positioned between the first outer layer and the second outer layer. In some embodiments the several fibers are oriented in a first direction aligned with one of the corners, and the rib in the second region is oriented in a second direction perpendicular to the first direction. Some embodiments can include an underpass that opens to the first region and the second region allowing an audible sound from the audio module to pass into the second region. Some embodiments can include a can member disposed over the main logic board having an opening configured to at least partially receive the main logic board. The can member may include a cover disposed over the can member and the opening where the cover may include a thermally conductive layer that draws and directs heat away from the main logic board and an electrically conductive layer disposed a surface over the thermally conductive layer, the electrically conductive layer providing an electrical grounding path for the main logic board.

In some embodiments the cover comprises a second electrically conductive layer over a second surface opposite the surface, and the electrically conductive layer and the second electrically conductive layer are adhesively secured with the thermally conductive layer via an electrically conductive adhesive. In some embodiments the thermally conductive layer comprises a graphite material, and the electrically conductive layer comprises a metal alloy that includes at least nickel and/or copper.

In some embodiments the thermally conductive layer is completely enclosed by the first and second electrically conductive layers. Some embodiments can include a second circuit board comprising a second integrated circuit and, a can member having a second opening configured to at least partially receive the second integrated circuit, the cover being disposed over the can member and the second opening.

In some embodiments the display is configured to receive a touch input and the electronic device can include a circuit assembly configured to providing a timing controller for the display, and a flexible circuit electrically coupled with the circuit assembly, where the main logic board comprises an integrated circuit electrically coupled with the flexible circuit and the flexible circuit carries only signals from the circuit assembly.

Some embodiments can include a second integrated circuit configured to receive a control signal in response to the touch input and a second flexible circuit that carries the control signal to the second integrated circuit, where the second flexible circuit is separate from the flexible circuit. Some embodiments can include a button configured to provide an input to a third integrated circuit electrically coupled with the circuit board. In some embodiments the flexible circuit extends from the main logic board to electrically couple with the display assembly. In some embodiments wherein the flexible circuit is split and has two portions that electrically couple with the main logic board.

Some embodiments can include a modular subscriber information module (SIM) card enclosure and tray assembly, with the assembly having a SIM card tray for supporting a SIM card, and a SIM enclosure configured to accept the SIM card tray. The SIM enclosure can include a lever arm arranged within the SIM enclosure and accessible from outside the SIM enclosure with a tool for depressing the lever arm and a pivot arm arranged about a pivot and within the SIM enclosure such that when the lever arm is depressed, the lever arm, rotates about the pivot to move the SIM card tray from within the SIM enclosure, when the SIM card tray is installed in the SIM enclosure. In some embodiments the SIM enclosure further comprises a retention clip for retaining the SIM card tray in the SIM enclosure. Some embodiments can include a SIM aperture in a sidewall of the electronic device housing and wherein the SIM card tray has a front portion configured to coordinate with the sidewall such that when the SIM card tray is installed in the SIM aperture, the front portion and the sidewall merge to make a smooth surface.

Some embodiments can include an electronic device, having an enclosure and a circuit board disposed in the enclosure, the circuit board carrying an integrated circuit. The electronic device can also include a can member disposed over the circuit board having an opening configured to at least partially receives the integrated circuit and a cover disposed over the can member and the opening. The cover may include a thermally conductive layer that draws and directs heat away from the integrated circuit, and an electrically conductive layer disposed a surface over the thermally conductive layer, the electrically conductive layer providing an electrical grounding path for the integrated circuit.

In some embodiments the cover includes a second electrically conductive layer over a second surface opposite the surface, and the electrically conductive layer and the second electrically conductive layer are adhesively secured with the thermally conductive layer via an electrically conductive adhesive. In some embodiments the thermally conductive layer includes a graphite material, and wherein the electrically conductive layer comprises a metal alloy that includes at least nickel and/or copper. In some embodiments the circuit board comprises a second integrated circuit that emits electromagnetic radiation, and the can member and the cover combine to define a shield that contains the electromagnetic radiation.

Some embodiments can include a first power source and a second power source, where the circuit board is disposed between the first power source and the second power source. In some embodiments the enclosure comprises a rib feature integrally formed with the enclosure, the rib feature defining a first region that receives an audio module and a second region that defines a back volume. Some embodiments can include a display assembly coupled with the enclosure, wherein the can member and the cover define a flat support feature for the display assembly.

Some embodiments can include electronic device having an enclosure and a display assembly coupled with the enclosure to receive a touch input. The electronic device can also include a circuit assembly extending along the enclosure to providing a timing controller for the display assembly and a flexible circuit electrically coupled with the circuit assembly. The electronic device can also include a circuit board comprising an integrated circuit electrically coupled with the flexible circuit, where the flexible circuit carries only signals from the circuit assembly.

In some embodiments the circuit board can include a second integrated circuit configured to receive a control signal in response to the touch input and a second flexible circuit that carries the control signal to the second integrated circuit, where the second flexible circuit is separate from the flexible circuit. Some embodiments can include a button configured to provide an input to a third integrated circuit electrically coupled with the circuit board. In some embodiments the flexible circuit can extend from the circuit board to electrically couple with the display assembly.

Some embodiments can also include a second circuit board comprising a second integrated circuit and a can member having an opening configured to at least partially receive the second integrated circuit. Some embodiments can also include a cover disposed over the can member and the opening, the cover having a thermally conductive layer and an electrically conductive layer.

Some embodiments can include a system for connecting a timing controller board and main logic board of an electronic device where the system can include an interposer board having an interpose connector, and a timing controller connector located on the timing controller board. The system can also include a main logic board connector located on the main logic board, and an integrated cable. The integrated cable can include a first connection configured to coordinated with the interposer connector, a second connection configured to coordinate with the timing controller connector and a third connection configured to coordinate with the main logic board connection.

In some embodiments the integrated cable has a main logic board portion and a timing controller portion and the main logic board portion is split into more than one tails with each tail having a connection. In some embodiments the connection of each tail of the main logic board portion coordinates with a respective connection on the main logic board. In some embodiments the first connection is a hot bar connection. In some embodiments the second and third connections are zero insertion force connections. In some embodiments the electronic device comprises a housing having a midline and the main logic board and interposer board are arranged along the midline. In some embodiments the electronic device can include a can that covers the main logic board, interposer board and the first and third connections. In some embodiments the can comprises a thermal dissipation layer. In some embodiments, the interposer board includes a chipset for converting analog signals to digital signals.

Some embodiments can include a system for shielding centralized electronic components of an electronic device, where the system can include multiple electronic components aligned along a midline of a housing of the electronic device and a can member configured to enclose all of the multiple electronic components.

Some embodiments can include a system the electronic device comprises a retention channel that surrounds the multiple components and is configured to coordinate with the can member to enclose the multiple components. In some embodiments the can member comprises spring biased ribs that retain the can member to the retention channel when the can is installed over the multiple components. In some embodiments the can member can include a sandwiched graphite thermal dissipation layer having a first conductive adhesive layer, a second conductive adhesive layer and a graphite layer between and fully enclosed by the first and second conductive adhesive layers.

In some embodiments the multiple electronic components are arranged on one or more printed circuit boards and wherein the can member is fastened to the one or more printed circuit boards by way of fasteners and fastener apertures on the can member. In some embodiments the fasteners and can member provide grounding for the multiple electronic components. In some embodiments the can member provides a contiguous flat surface over the multiple electronic components. In some embodiments the electronic device comprises a display that rests on the can member when the display and can member are installed in the electronic device.

Some embodiments can include a method that can include arranging a main logic board within a single piece housing of a portable electronic device for carrying operational components, the housing having a front opening, an integral bottom and sidewalls that cooperate to form a cavity in cooperation with the front opening such that the main logic board extends along a central portion of the cavity having a size and shape that bisects the cavity into a first portion and a second portion each having substantially the same size and shape. The method can include disposing a power storage system at the bottom wall, the power storage system comprising a first power storage unit located in the first portion and second power storage unit located in the second portion, each being coupled to the main logic board and positioning self-contained audio components positioned at each corner of the single piece housing. The method can include arranging a display to the housing to present visual content within the front opening, the display having an outermost protective layer.

In some embodiments the display is configured to receive a touch input and the method can include disposing a circuit assembly to the display configured to providing a timing controller for the display and electrically coupling a flexible circuit to the circuit assembly, where the main logic board comprises an integrated circuit electrically coupled with the flexible circuit and the flexible circuit carries only signals from the circuit assembly.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device, comprising:
   a single piece housing arranged to carry operational components and comprising: a front opening, a bottom wall and sidewalls integrated with the bottom wall that cooperate to form a cavity in cooperation with the front opening, the operational components comprising:
   a display capable of presenting visual content and disposed within the front opening and having an outermost protective layer;
   a main logic board that extends along a central portion of the cavity having a size and shape that bisects the cavity into a first portion and a second portion each having substantially the same size and shape;
   a power storage system supported at the bottom wall and comprising a first power storage unit located in the first portion and second power storage unit located in the second portion, each being coupled to the main logic board;
   a self-contained audio module positioned at each corner of the single piece housing;
   a can member disposed over the main logic board and comprising an opening that at least partially receives the main logic board;
   a cover disposed over the can member and the opening, the cover comprising:
   a thermally conductive layer that draws and directs heat away from the main logic board; and
   an electrically conductive layer disposed over a surface of the thermally conductive layer, the electrically conductive layer providing an electrical grounding path for the main logic board.

2. The electronic device of claim 1, wherein the self-contained region comprises a rib integrally formed within the second portion and disposed in the second portion, the rib capable of spreading an acoustical energy of the audio module.

3. The electronic device of claim 2, wherein the second portion comprises a rib integrally formed within the second portion and disposed in the second portion, the rib capable of spreading an acoustical energy of the audio module.

4. The electronic device of claim 3, further comprising a cover sealed with the rib at the second portion that combines with the second portion to define a back volume for the audio module, the cover comprising several layers of materials, and wherein at least one layer of material comprises carbon fiber having several fibers.

5. The electronic device of claim 4, wherein the cover includes a first outer layer, a second outer layer, and an inner layer positioned between the first outer layer and the second outer layer.

6. The electronic device of claim 4, wherein the several fibers are oriented in a first direction aligned with one of the corners, and the rib in the second portion is oriented in a second direction perpendicular to the first direction.

7. The electronic device of claim 2, further comprising an underpass that opens to the first portion and the second portion allowing an audible sound from the audio module to pass into the second portion.

8. The electronic device of claim 1, wherein the cover comprises a second electrically conductive layer over a second surface opposite the surface and wherein the electrically conductive layer and the second electrically conductive layer are adhesively secured with the thermally conductive layer via an electrically conductive adhesive.

9. The electronic device of claim 8, wherein the thermally conductive layer comprises a graphite material and wherein the electrically conductive layer comprises a metal alloy that includes at least nickel or copper.

10. The electronic device of claim 9, wherein the thermally conductive layer is completely enclosed by the first and second electrically conductive layers.

11. The electronic device of claim 1, further comprising a second circuit board comprising a second integrated circuit, the can member having a second opening that at least partially receives the second integrated circuit, the cover being disposed over the can member and the second opening.

12. An electronic device, comprising:
a single piece enclosure arranged to carry operational components and comprising: a front opening, a bottom wall and sidewalls integrated with the bottom wall that cooperate to form a cavity in cooperation with the front opening;
audio modules symmetrically disposed on opposite sidewalls, wherein each audio module includes:
a rib feature integrally formed with the enclosure, the rib feature defining a first region that receives an audio module and a second region connected to the first region;
a cover sealed with the rib feature at the second region that combines with the second region to define a back volume for the audio module; and
a main logic board that extends along a central portion of the cavity having a size and shape that bisects the cavity into a first portion having a first power source and a second portion having a second power source;
a can member disposed over the main logic board and comprising an opening that at least partially receives the main logic board;
a cover disposed over the can member and the opening, the cover comprising:
a thermally conductive layer that draws and directs heat away from the main logic board; and
an electrically conductive layer disposed over a surface of the thermally conductive layer, the electrically conductive layer providing an electrical grounding path for the main logic board.

13. The electronic device of claim 12, wherein the second region comprises a rib integrally formed within the second region and disposed in the second region, the rib capable of spreading an acoustical energy of the audio module.

14. The electronic device of claim 13, wherein the cover comprises several layers of materials, and wherein at least one layer of material comprises carbon fiber having several fibers.

15. The electronic device of claim 14, wherein the cover includes a first outer layer, a second outer layer, and an inner layer positioned between the first outer layer and the second outer layer.

16. The electronic device of claim 15, wherein:
the enclosure comprises a corner,
the several fibers are oriented in a first direction aligned with the corner, and
the rib in the second region is oriented in a second direction perpendicular to the first direction.

17. A method for forming a portable electronic device, the method comprising:
arranging a main logic board within a single piece housing of the portable electronic device for carrying operational components, the housing having a front opening, a bottom wall and sidewalls integrated with the bottom wall that cooperate to form a cavity in cooperation with the front opening such that the main logic board extends along a central portion of the cavity having a size and shape that bisects the cavity into a first portion and a second portion each having substantially the same size and shape;
disposing a power storage system at the bottom wall, the power storage system comprising a first power storage unit located in the first portion and second power storage unit located in the second portion, each being coupled to the main logic board;
positioning a self-contained audio components positioned at each corner of the single piece housing; and
arranging a display to present visual content within the front opening, the display having an outermost protective layer;
disposing a can member over the main logic board, the can member comprising:
an opening that at least partially receives the main logic board, and
a cover disposed on the can member and the opening, the cover comprising:
a thermally conductive layer that draws and directs heat away from the main logic board; and
an electrically conductive layer disposed on a surface over the thermally conductive layer, the electrically conductive layer providing an electrical grounding path for the main logic board.

18. The method of claim 17, wherein the self-contained audio module comprises a rib feature defining a first region that receives an audio module and a second region connected to the first region.

* * * * *